United States Patent [19]
Chiu et al.

[11] Patent Number: 6,091,847
[45] Date of Patent: Jul. 18, 2000

[54] AUTOMATED VISUAL INSPECTION APPARATUS FOR DETECTING DEFECTS AND FOR MEASURING DEFECT SIZE

[75] Inventors: Chinchuan Chiu, New City, N.Y.; Philip Paolella, Waldwick, N.J.; Michael Leary, Penn Hills, Pa.; Joseph A. Marcanio, Greensburg, Pa.; Fusao Ishii, Pittsburg, Pa.

[73] Assignees: Sony Corporation, Tokyo, Japan; Sony Electronics, Inc., Park Ridge, N.J.

[21] Appl. No.: 09/026,965

[22] Filed: Feb. 20, 1998

(Under 37 CFR 1.47)

Related U.S. Application Data

[62] Division of application No. 08/616,621, Mar. 15, 1996.
[51] Int. Cl.$^7$ .................................................. G06K 9/00
[52] U.S. Cl. ................................... 382/149; 348/125
[58] Field of Search ................................ 382/144, 149, 382/190, 192; 348/86, 92, 128, 125, 129

[56] References Cited

U.S. PATENT DOCUMENTS

| | | | |
|---|---|---|---|
| 5,465,308 | 11/1995 | Hutcheson et al. | 382/159 |
| 5,467,402 | 11/1995 | Okuyama et al. | 382/104 |
| 5,488,674 | 1/1996 | Burt et al. | 382/284 |
| 5,579,444 | 11/1996 | Dalziel et al. | 382/153 |

*Primary Examiner*—Bhavesh Mehta
*Attorney, Agent, or Firm*—Frommer Lawrence & Haug, LLP.; William S. Frommer

[57] ABSTRACT

Apparatus for detecting etch defects in an object having a plurality of openings by generating an image signal of the object representing light intensity values of a plurality of pixels, processing the image signal to form data signals representing light intensity values of groups of pixels, filtering the data signals to remove signals representing the ends of the openings, and pairing two data signals when the groups of pixels represented thereby represent an etch defect.

8 Claims, 19 Drawing Sheets

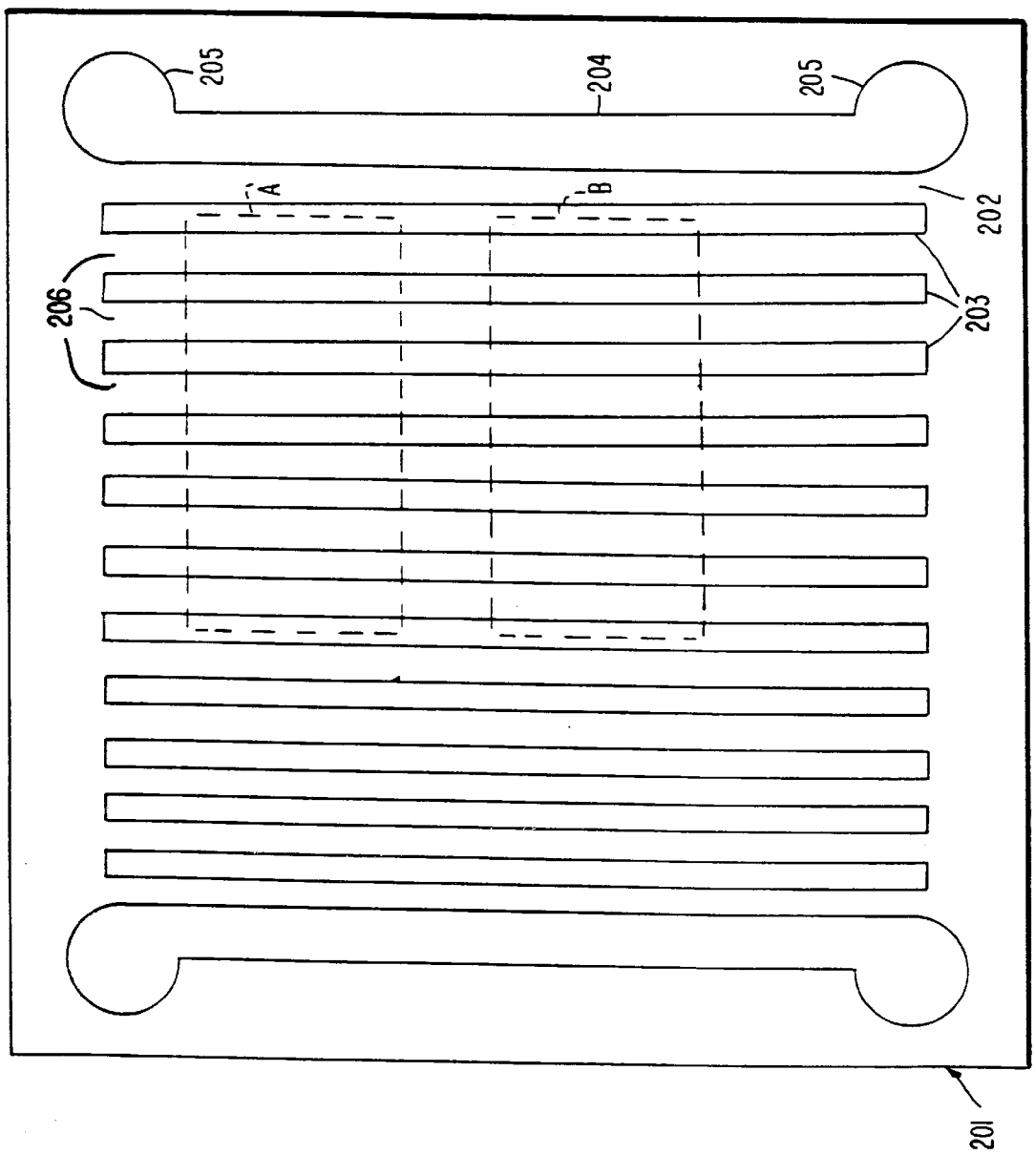

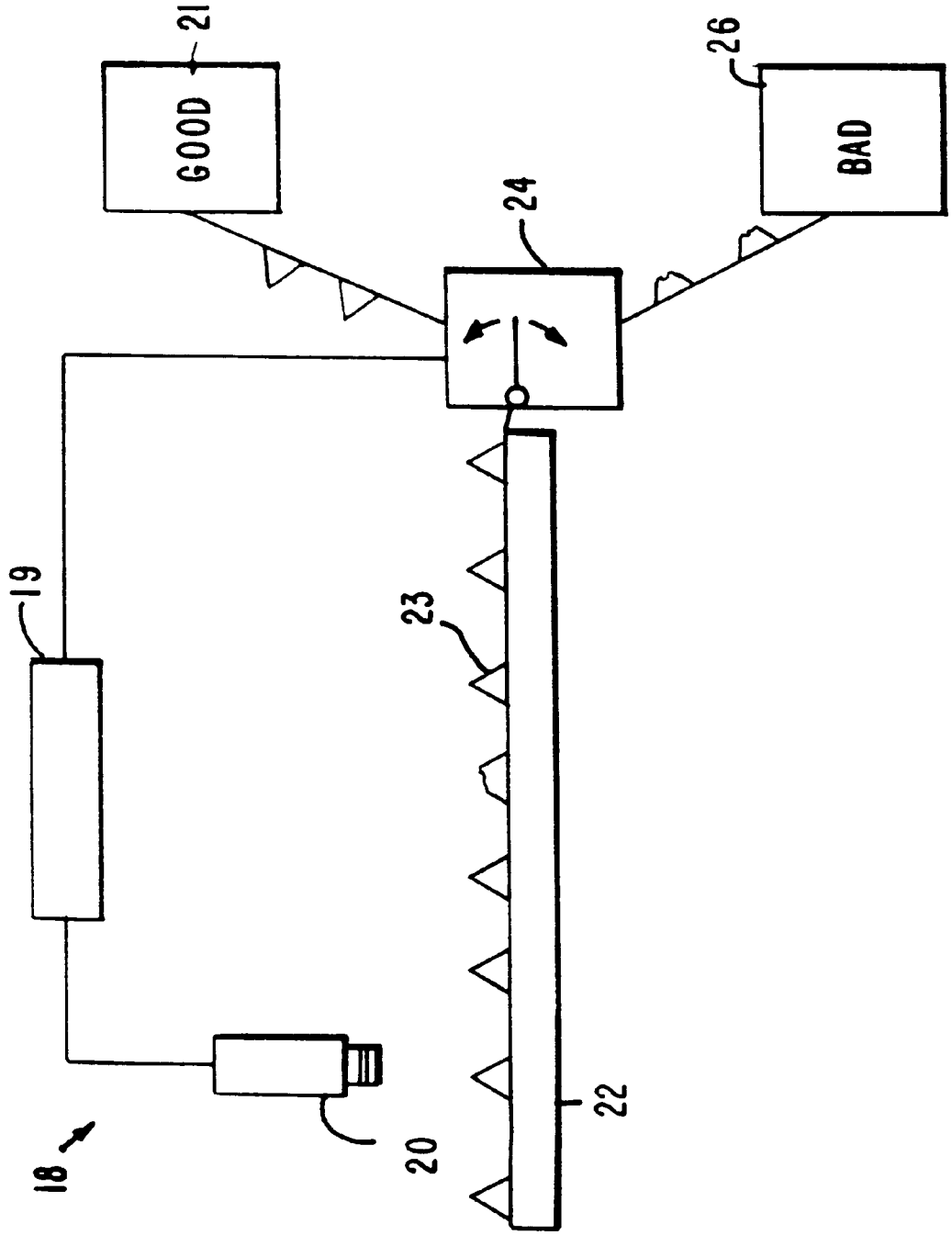

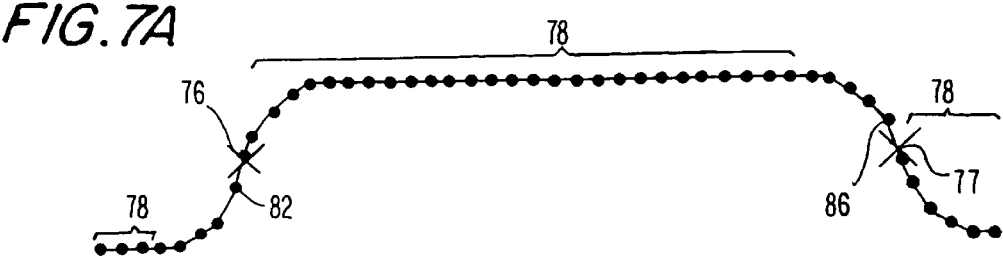
FIG. 7A
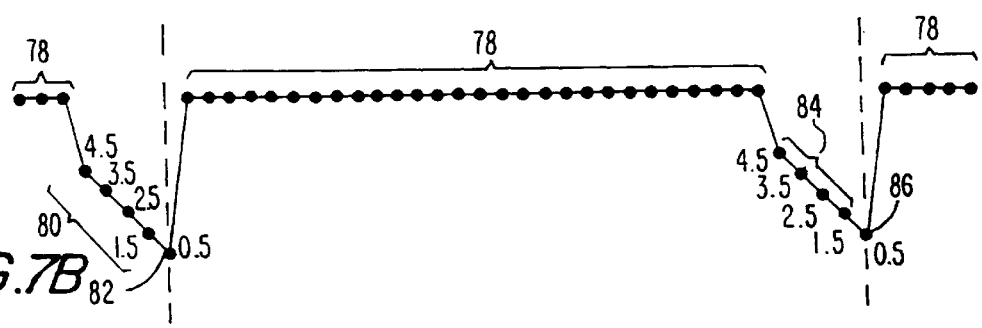
FIG. 7B
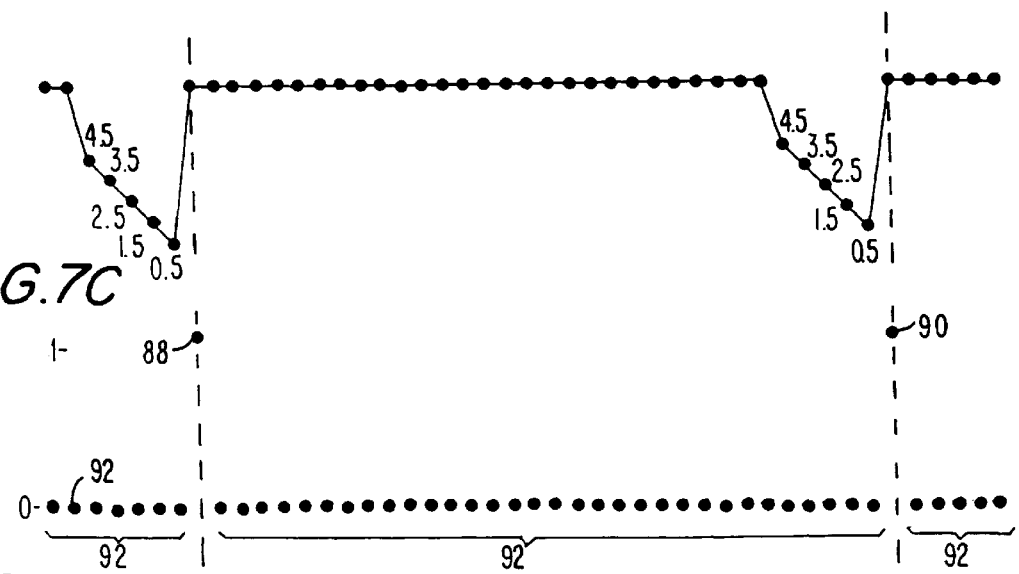
FIG. 7C
FIG. 7D

FIG. 15B

| 252 | 252 | 252 | 252 | 252 | 252 | 251 | 252 | 252 | 252 | 252 | 252 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 88 | 110 | 55 | 5 | 0 | 0 | 0 |
| 0 | 0 | 0 | 0 | 126 | 255 | 255 | 249 | 231 | 6 | 0 | 0 |
| 255 | 203 | 203 | 204 | 204 | 237 | 255 | 255 | 255 | 255 | 220 | 211 | 211 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |

FIG. 15A

| 10 | 10 | 10 | 10 | 10 | 10 | 10 | 10 | 10 | 10 | 10 | 10 |
|---|---|---|---|---|---|---|---|---|---|---|---|
| 255 | 255 | 255 | 255 | 255 | 255 | 255 | 255 | 255 | 255 | 255 | 255 |
| 255 | 255 | 255 | 255 | 255 | 255 | 219 | 184 | 226 | 255 | 255 | 255 | 255 |
| 255 | 255 | 255 | 231 | 41 | 0 | 0 | 0 | 35 | 181 | 255 | 255 | 255 |
| 73 | 72 | 70 | 51 | 0 | 0 | 0 | 0 | 47 | 68 | 68 | 67 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG.15D

| 0 | 0 | 0 | 0 | -88 | -109 | 33 | 105 | 55 | 5 | 0 | 0 |
|---|---|---|---|---|---|---|---|---|---|---|---|
| 0 | 0 | 0 | -126 | -343 | -238 | 39 | 129 | 298 | 236 | 6 | 0 |
| 0 | -1 | -1 | -159 | -394 | -257 | 39 | 129 | 333 | 280 | 15 | 0 |
| 0 | -1 | -1 | -159 | -394 | -257 | 39 | 129 | 333 | 280 | 15 | 0 |
| 0 | -1 | -1 | -159 | -394 | -257 | 39 | 129 | 333 | 280 | 15 | 0 |
| 0 | -1 | -1 | -159 | -306 | -147 | 6 | 24 | 278 | 275 | 15 | 0 |
| 0 | -1 | -1 | -33 | -51 | -19 | 0 | 0 | 35 | 44 | 9 | 0 |

FIG.15C

| 0 | 0 | 0 | 0 | 36 | 71 | -7 | -71 | -29 | 0 | 0 | 0 |
|---|---|---|---|---|---|---|---|---|---|---|---|
| 0 | 0 | 24 | 214 | 267 | 112 | -42 | -252 | -249 | -74 | 0 | 0 |
| -1 | 3 | 45 | 284 | 318 | 112 | -42 | -299 | -317 | -95 | -1 | -1 |
| -1 | 3 | 45 | 284 | 318 | 112 | -42 | -299 | -317 | -95 | -1 | -1 |
| -1 | 3 | 45 | 284 | 318 | 112 | -42 | -299 | -317 | -95 | -1 | -1 |
| -1 | 3 | 45 | 284 | 282 | 41 | -35 | -228 | -288 | -95 | -1 | -1 |
| -1 | 3 | 24 | 70 | 51 | 0 | 0 | -47 | -68 | -21 | -1 | -1 |

AUTOMATED VISUAL INSPECTION APPARATUS FOR DETECTING DEFECTS AND FOR MEASURING DEFECT SIZE

This is a divisional of prior application Ser. No. 08/616,621, filed Mar. 15, 1996.

BACKGROUND OF THE INVENTION

This invention relates to defect detection apparatus for visually inspecting and measuring the features of an object, and, more particularly, to such apparatus for inspecting a perforated object for etch defects and measuring the dimensions of such defects.

Despite efforts to insure uniformity, modern manufacturing processes continue to mass-produce products with varying characteristics. Inspection mechanisms are utilized to sort units of product according to the individual characteristics of each. In some applications, both objective and subjective quality standards are applied to judge a product's characteristics. Extremely fine gradations of quality can pose a difficult inspection challenge.

In some industries, teams of human inspectors are employed to inspect the output of mass-production manufacturing to determine the compliance of each unit of product with the applicable standards. Relative to automated manufacturing, the process of human inspection has proven to be slow, inefficient, and costly, thereby limiting overall manufacturing throughput. In some industrial settings human inspection is entirely infeasible because the demands for speed and accuracy simply exceed human capacity.

At present, human inspectors are still utilized by video display manufacturers to inspect video display components. A particularly time-consuming and exhausting task is the inspection of aperture grills. An example of an aperture grill 201 is illustrated in FIGS. 1A, 1B, 1C, and 1D. An aperture grill is used during the manufacture of video displays to mask the interior surface of a display screen for the application of phosphorus coatings. Also, aperture grills are physically incorporated into video display screens as a means for focusing an incident beam of electrons from an electron gun.

Typically, an aperture grill 201 is comprised of a thin sheet 202 of material, preferably metal, in which a number of openings 203 and 204 have been formed. As depicted in FIG. 1A, the aperture grill 201 includes a number of openings 203, preferably substantially rectangular. Long, thin and substantially rectangular openings are referred to as "slits". As illustrated, each of the slits 203 includes two respective "slit ends" 207 located at opposite ends of the slit. The long, thin portions of the sheet 202 that remain interspersed among the openings 203 are called "ribbons" 206, also referred to as "tapes". In the following discussion, the terms "slits" and "ribbons" should be understood to include "openings" and "tapes", respectively.

In a preferred embodiment, the width of each of slits 203 is between 140 and 260 microns and the width of each of ribbons 206 is between 500 and 1000 microns. These ranges are given merely as examples, as an aperture grill need not be so limited.

At each end of the aperture grill 201, and substantially parallel to the slits 203, is a breakaway tab 204. Each breakaway tab 204 preferably consists of an opening with two long straight sides and two curved ends 204A and 204B. An aperture grill may be perforated with a number of additional openings; however, description of such has been omitted in the interest of brevity.

FIG. 1B presents a magnified illustration of area B of FIG. 1A. FIG. 1B illustrates ribbons 206; slit ends 205, 205' and 205"; under-etch defects 208 and 208'; over-etch defects 209 and 209'; and bridge defect 208".

Etch defects 208, 208', 208", 209, and 209' result from process variations which occur during the etching of slits 203. As illustrated, under-etch defects 208, 208', and 208" result in an excess of material protruding from a ribbon 206 into a slit 203, interrupting the otherwise substantially straight edges of the slit. Similarly, over-etch defects 209 and 209" result in a localized void in a ribbon 206, increasing the width of the slit at that location, and interrupting the otherwise substantially straight edges of the slit. Bridge defect 208", an extreme under-etch defect, connects two of ribbons 206 with a "bridge" of material, as shown. Slit ends 205' and 205" illustrate irregular slit ends that can result from an imperfect etching process.

An etch defect of large enough size will render a particular aperture grill unsuitable for use. Specifically, an aperture grill containing a single etch defect having dimensions greater than 50 microns by 150 microns will cause an undesirable blemish on an operating video display into which the aperture grill is incorporated. As the detection of even smaller defects may be necessary in some applications, the present invention is not limited to the detection of defects of any particular dimensions. Further, it should be appreciated that any portion of an aperture grill may include one or more under-etch, over-etch, and bridge defects.

In FIG. 1C, the slits 210, 211, and 214 have approximately the same width (ignoring localized defects), whereas slit 212 is relatively wider and slit 213 is relatively thinner. Each of ribbons 206 has the same width (ribbon width 206').

A "pitch" may be defined as the distance between two corresponding edges of two adjacent pairs of edges 207 (e.g. the distance between the left-hand edges or the right-hand edges of two adjacent slits). Thus, there are at least two ways to define the pitches of an aperture grill. For example, pitch 212' is the distance between the right-hand edge of slit 211 and the right-hand edge of slit 212, and thus spans slit 212. Pitch 212" is the distance between the left-hand edge of slit 212 and the left-hand edge of slit 213.

As illustrated in FIG. 1C, it is apparent that the pitch (212', 212") spanning slit 212 is greater than the pitch (214', 214") spanning slit 214. In contrast, the pitch spanning slit 213 (213', 213") is less than the pitch spanning slit 214 (214', 214"). A pitch defect is defined as a pitch which varies substantially from the average of the pitches of an aperture grill. For a typical video display, pitch defects in excess of three percent of the average pitch of the aperture grill are noticeable to the human eye, and render the aperture grill unsuitable for use. Pitches 212' (212") and 213' (213") illustrate two types of pitch defects.

Another type of defect that occurs in aperture grills is a width defect. Examples of four width defects are provided in FIG. 1D. FIG. 1D presents a magnified illustration of area B of FIG. 1A. FIG. 1D illustrates ribbons 206, 206a, and 206b; ribbon widths 206', 206a', and 206b'; slits 215–217; and slit widths 215'–217'. As depicted, each of ribbons 206 is of the same width 206', whereas ribbon 206a has a greater width 206a' and ribbon 206b has a lesser width 206b'. Each of slits 215 is of the same width 215', whereas slit 216 has a lesser width 216' and slit 217 has a greater width 217'.

If it is assumed that width 206' is a typical ribbon width and width 215' is a typical slit width, then ribbon 206a demonstrates a first type of width defect as it is wider than ribbon 206, i.e. 206a' is greater than 206'. Ribbon 206b demonstrates a second type of width defect as it is thinner than ribbon 206, i.e. 206b' is less than 206'. Slit 216 demonstrates a third type of width defect as it is thinner than slit 215, i.e. 216' is less than 215'. Slit 217 demonstrates a fourth type of width defect as it is wider than slit 215, i.e. 217' is greater than 215'.

It should be appreciated that the concepts of pitch, pitch defect, and width defect may be defined in numerous ways and that the present invention is not limited to the above-described definitions. For example, pitch might be calculated as the distance between the centers of two adjacent slits or between the centers of two adjacent ribbons. A pitch defect might be defined as a pitch which falls outside a predetermined range of pitches.

Although automatic visual inspection systems have been created to meet the inspection demands of a variety of specific manufacturing applications, the inspection of aperture grills has yet to be automated. A visual inspection system 18 is illustrated in FIG. 2. As shown therein, such a system 18 includes a transport mechanism 22, a scanner 20, a processor 19, a sorter 24, a "good" bin 21, and a "bad" bin 26.

In the system 18 of FIG. 2, the transport mechanism 22 conveys a series of objects 23 through the scanning field of scanner 20 to the sorter 24. Scanner 20 acquires a visual image of each object 23 and sends the image to the processor 19 to be analyzed. The processor 19 analyzes the visual image corresponding to each of the objects 23 and classifies the particular object 23 as either "good" or "bad." Accordingly, the processor 19 controls the operation of sorter 24, causing it to route each object 23 to either the "good" bin 21 or the "bad" bin 26.

To date, aperture grills have been considered unsuitable for automatic visual inspection due to the limited resolution of available imaging technology and the considerable expense of hardware capable of processing vast amounts of image data at assembly-line speeds. Thus, an economically feasible automatic visual inspection system suitable for inspecting aperture grills for etch and pitch defects in a manufacturing environment is needed.

OBJECTS AND SUMMARY OF THE INVENTION

An object of the present invention is to provide an automatic visual inspection system suitable for inspecting aperture grills in a manufacturing environment.

More specifically, it is an object of the present invention to provide apparatus for detecting etch defects in the edges of an aperture grill having a plurality of slits with respective edges.

Another object of the present invention is to provide apparatus for measuring the size of an etch defect in an aperture grill.

A further object of the present invention is to provide apparatus for determining whether an etch defect in an aperture grill is an under-etch defect or an over-etch defect.

Yet another object of the present invention is to provide a real-time, automatic, visual inspection apparatus, having a pipelined data processing configuration, for inspecting aperture grills for etch defects and for classifying such defects.

In accordance with an aspect of the present invention, apparatus for inspecting an object having a plurality of substantially longitudinally-shaped openings, each opening having two opposite ends, to detect etch defects in the object is provided. An imaging device generates an image signal of the object representing light intensity values of a plurality of pixels and a processing device processes the image signal to form data signals representing light intensity values of groups of the pixels. A filtering device removes signals corresponding to the ends from the data signals and a pairing device pairs two of the data signals to form a pair of data signals if the groups of pixels represented by the two data signals satisfy at least one predetermined condition whereby the pair of data signals represents an etch defect.

In accordance with another aspect of the present invention, an apparatus for inspecting an object having a plurality of substantially longitudinally-shaped openings, each opening having two opposite ends, to detect etch defects in the object is provided. An imaging device generates an image signal of the object representing light intensity values of a plurality of pixels and a processing device processes the image signal to form data signals representing light intensity values of groups of the pixels. A filtering device removes signals corresponding to the ends from the data signals and a determining device determines if any of the data signals represents an etch defect.

In accordance with yet another aspect of the present invention, an apparatus for inspecting an object having a plurality of substantially longitudinally-shaped openings, each opening having two opposite ends, to detect etch defects in the object is provided. An imaging device generates an image signal of the object representing light intensity values of a plurality of pixels and a processing device processes the image signal to form data signals representing light intensity values of groups of the pixels. A pairing device pairs two of the data signals to form a pair of data signals if the groups of pixels represented by the two data signals satisfy at least one predetermined condition whereby the pair of data signals represents an etch defect. The pairing device includes a device that counts the pixels in each of the groups of pixels represented by the two data signals to generate size signals representing group size values and a device that compares the group size values represented by the size signals to a predetermined minimum group size value. Further, the predetermined condition includes the condition that the group size values corresponding to the two data signals exceed the predetermined minimum group size value.

In accordance with still another aspect of the present invention, a system for inspecting a plurality of objects for etch defects, each object having a plurality of substantially longitudinally-shaped openings and each opening having two opposite ends is provided. An imaging device generates an image signal of each of the objects representing light intensity values of a plurality of pixels and a processing device processes each image signal to form data signals representing light intensity values of groups of the pixels. A filtering device removes signals corresponding to the ends from the data signals and a pairing device pairs two of the data signals to form a pair of data signals if the groups of pixels represented by the two data signals satisfy at least one predetermined condition whereby the pair of data signals represents an etch defect.

In each of the aforementioned aspects of the invention it should be noted that the object to be inspected could be an aperture grill having slits, a shadow mask having circular holes or rounded slots, or any other perforated object.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 1A is a diagram of an aperture grill;

FIG. 2 is a diagram of a general automatic visual inspection apparatus;

FIGS. 7A–7D are signal diagrams to which reference will be made in explaining the operation of the edge detection apparatus of FIG. 4;

FIGS. 15A and 15B are diagrams of portions of FIG. 14 superimposed with light intensity values;

FIGS. 15C and 15D are tables of convolution results to which reference will be made in describing a convolution operation;

DETAILED DESCRIPTION OF THE PREFERRED EMBODIMENTS

Figure 3:
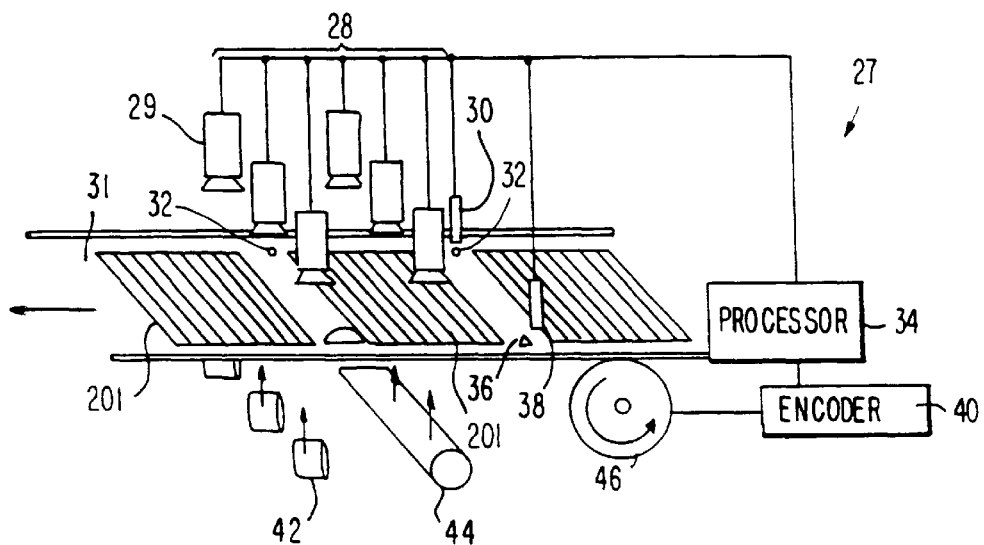
FIG. 3 is a perspective diagram of an automatic visual inspection apparatus.

FIG. 3 illustrates automatic visual inspection apparatus 27 for inspecting an entire aperture grill. The apparatus 27 generally includes a camera array 28, a mask sensor 30, a processor 34, a cycle detector 38, an encoder 40, lighting devices 42 and 44, and a motor 46. Each aperture grill 201, hereinafter "grill", is situated on a web 31 and is separated from the adjacent grills by mask holes 32 in web 31. Further, groups of grills are delineated by cycle hole 36 in web 31. In the preferred embodiment, a single cycle of aperture grills consists of a group of twenty-seven grills.

Camera array 28 is comprised of one or more cameras 29 adapted to acquire images of an object as pixels of image data. Typically, each camera 29 is comprised of a plurality of light-sensitive sensors, each of which produces light intensity values as a function of the amount of incident light. A light intensity value, matched with the relative coordinates of the sensor, forms a pixel. Thus, the acquired image is represented by a plurality of pixels, each pixel having a light intensity value and identifying coordinates. Each camera 29 in the array 28 may be associated with a microprocessor system (such as a Motorola 68040 microprocessor-based system) and/or a dedicated image processor (such as a Datacube MAXTD) for immediate data processing of acquired image data.

Mask sensor 30 and cycle detector 38 are detection devices that sense the presence of markings on web 31. Mask hole 32 and cycle hole 36 are two such markings, preferably arranged at opposite ends of web 31 to avoid erroneous detections.

Processor 34 is connected to each camera 29 in camera array 28, mask sensor 30, cycle detector 38, encoder 40, and lighting devices 42 and 44. Processor 34 is a software-controlled microprocessor-based system which receives input signals from camera array 28, mask sensor 30, cycle detector 38, and encoder 40. Based upon the input signals, processor 34 provides control-signals to lighting devices 42 and 44 and to camera array 28. Through control signals, processor 34 coordinates the movement, lighting, and scanning of the aperture grills 201 to assure system-wide synchronization.

Also, processor 34 is coupled to and provides information signals to one or more peripheral devices (not shown). The peripheral devices may include data storage devices, performance monitoring devices, sorting devices, marking devices, etc. The information signals may detail the operating characteristics of the various components of the automatic visual inspection system 27 and may include real-time inspection information regarding the aperture grills 201.

Motor 46 is mechanically engaged with web 31, driving web 31 forward as indicated by the arrow in FIG. 3. As web 31 moves forward, it carries a plurality of aperture grills 201 through the scanning fields of camera array 28, mask sensor 30, and cycle detector 38. Processor 34 collects information relating to the position and speed of the web from mask sensor 30, cycle detector 38, and encoder 40 and determines the position and speed of the web and the beginning of a cycle of grills and/or the beginning of a single grill. Based upon the position and speed of the web, processor 34 calculates the appropriate light intensity level for each of lighting devices 42 and 44 and provides appropriate intensity signals to each.

Encoder 40 is a detection device for monitoring the operation of motor 46. As motor 46 turns, propelling web 31 forward, encoder 40 detects the change in position of the motor and generates a position signal representative thereof. For example, each increment of rotation of the motor may be represented by a single digital pulse.

As will be appreciated by one of ordinary skill, since the linear displacement of web 31 can be expressed as a function of the angular displacement of motor 46, the position and speed of the web, and the like, can be determined from the position signal. In a preferred embodiment, the encoder is configured to generate one digital pulse each time the motor rotates through an angle sufficient to drive the web a certain distance, for example 25, 50, or 100 microns. Encoder 40 supplies the position signal to processor 34 and/or to camera array 28 directly. Processor 34 is adapted to calculate from the position signal and other input data the position and speed of web 31, or the like, and generate appropriate control signals for supply to the camera array and the lighting devices. Alternatively, microprocessor systems (such as a Motorola 68040 microprocessor-based system) associated, respectively, with each of the cameras in array 28 may perform such calculations and the like. Preferably, the position signal from encoder 40 is supplied directly to one or more cameras in camera array 28 to synchronize camera operation with movement of the aperture grills.

Each camera 29 in array 28 acquires image data representing a portion of an aperture grill 201 which has passed through its scanning field. Acquired image data is transmitted to processor 34 for processing and analysis. Optionally, acquired image data is pre-processed locally by individual microprocessor systems associated, respectively, with each camera 29 prior to being transmitted to processor 34. Processor 34 processes the image data and analyzes the processed data for indications of defective aperture grills in the manner to be described below. The location and type of each defect, along with other information regarding each aperture grill, may be stored or provided to peripheral devices.

Figure 4:
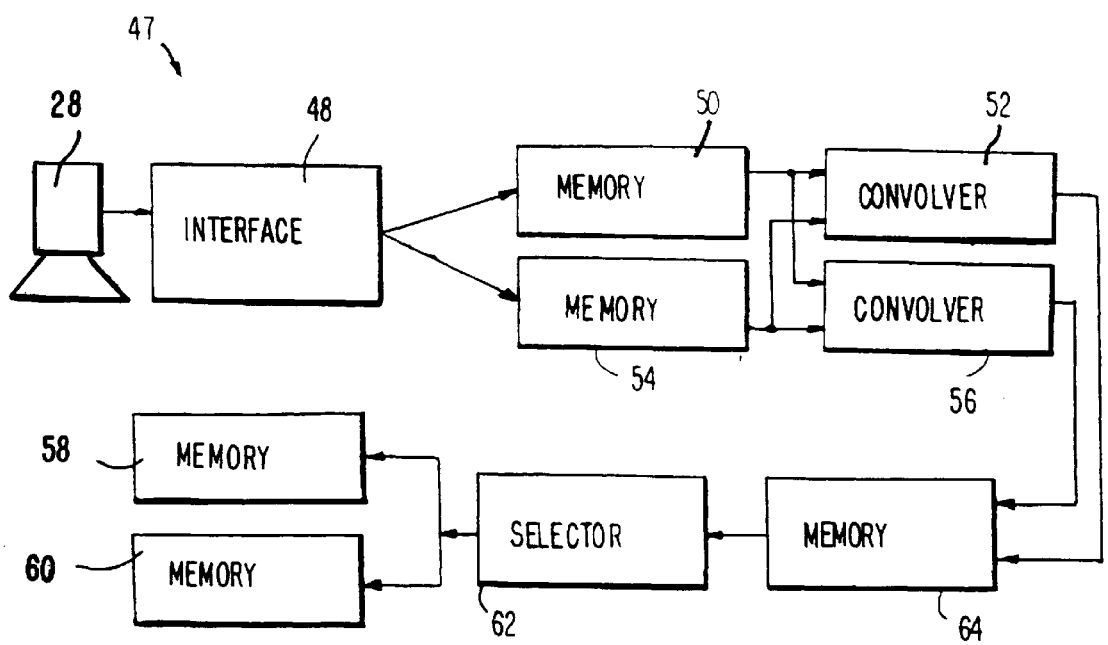
FIG. 4 is a block diagram of edge detection apparatus.

According to one embodiment of the present invention, camera 29 and processor 34 of FIG. 3 form an edge detection apparatus 47, as illustrated in detail in FIG. 4. The edge detection apparatus 47 is comprised of camera 29; interface 48; buffer memories 50 and 54; edge memories 58 and 60; and look-up table memory 64; convolvers 52 and 56; and selector 62. Edge detection apparatus 47 has a pipelined architecture, facilitating the storage, processing, and compression of large quantities of pixel data at assembly-line speeds. An automated visual inspection system incorporating the edge detection apparatus of the present invention quickly and efficiently identifies the edge of an inspected object and thus alleviates the inspection bottleneck which has substantially limited prior art manufacturing efforts.

Camera 29 is a conventional scanning device, such as a Dalsa linescan camera that generates one line of image data formed of 2048 pixels. Preferably, lines of image data are acquired at approximately 100 micron intervals along each aperture grill. Each sensor of the Dalsa camera has an 8×8 micron resolution resulting in an overall scan width of 16.384 mm. The Dalsa camera acquires 1,650 lines per second to produce 3.379M pixels of information per second. Interface 48 is coupled to and receives lines of pixel data from camera 29 and is also connected to each of buffer memories 50 and 54 to selectively provide each buffer memory with such lines of pixel data. Buffer memories 50 and 54 serve as buffers to store and provide blocks of pixel data to convolvers 52 and 56.

In a preferred embodiment, interface 48 alternately provides a group of lines of pixel data to each of buffer memories 50 and 54. After receiving each group, the respective memory provides the received group to both of convolvers 52 and 56. Thus, buffer memories 50 and 54 operate to alternately store and read out pixel data and thereby serve as buffering storage for the acquired image. Alternatively, interface 48 and buffer memories 50, 54 could be replaced by a single memory unit capable of simultaneously reading and writing stored information.

Convolvers 52 and 56, also referred to as "neighborhood multiplier accumulators", are coupled to look-up table memory 64, and operate upon groups of pixels to produce a series of look-up table memory addresses. It is preferred that each of convolvers 52 and 56 operates upon 6×1 groups of pixel data to produce a look-up table address coordinate. Taken together, two look-up table address coordinates, one output from each convolver, form a look-up table memory address. Look-up table memory addresses, along with the location coordinates of each corresponding group of pixels, are provided to memory 64. The location coordinates serve to identify the location of the particular group of pixels in an acquired image.

Convolvers 52 and 56 each conduct a convolution operation upon a group of pixels. In a preferred convolution operation, the light intensity values of a group of pixels are multiplied by an array (or kernel) of values having dimensions similar to that of the group. The results of these multiplications are summed to produce a single convolution result. The convolution result may serve as a look-up table memory address directly or first be subjected to further processing.

Each of convolvers 52 and 56 is preferably comprised of a series of multipliers and adders. Alternatively, a convolver is comprised of one or more arithmetic units or processors for achieving the convolution result.

Look-up table memory 64 is pre-stored with values and is coupled to selector 62. Look-up table memory 64 functions as a look-up table, accessing one or more stored values in response to each address provided by convolvers 52 and 56. Accessed values, along with location coordinates for each corresponding group of pixels, are output to selector 62.

Selector 62 selects local minima from among the accessed values received from the look-up table memory 64. Selector 62 is coupled to edge memories 58 and 60 and provides one memory with selected local minima and the other with location coordinates for each corresponding group of pixels. Preferably, selector 62 is arranged as a pipelined series of memories and arithmetic logic units. Edge memories 58 and 60 store the data provided by selector 62.

In operation, camera 29 scans an aperture grill having a series of alternating ribbons and slits in a direction substantially perpendicular to the orientation of the ribbons and slits. Light shining through the bottom surface of the aperture grill creates an image projected to the camera as alternating bands of light, dark, and shades of grey. Further operation of edge detection apparatus 47 will be explained in conjunction with FIGS. 5, 6, 7A–D, and 8.

Figure 5:
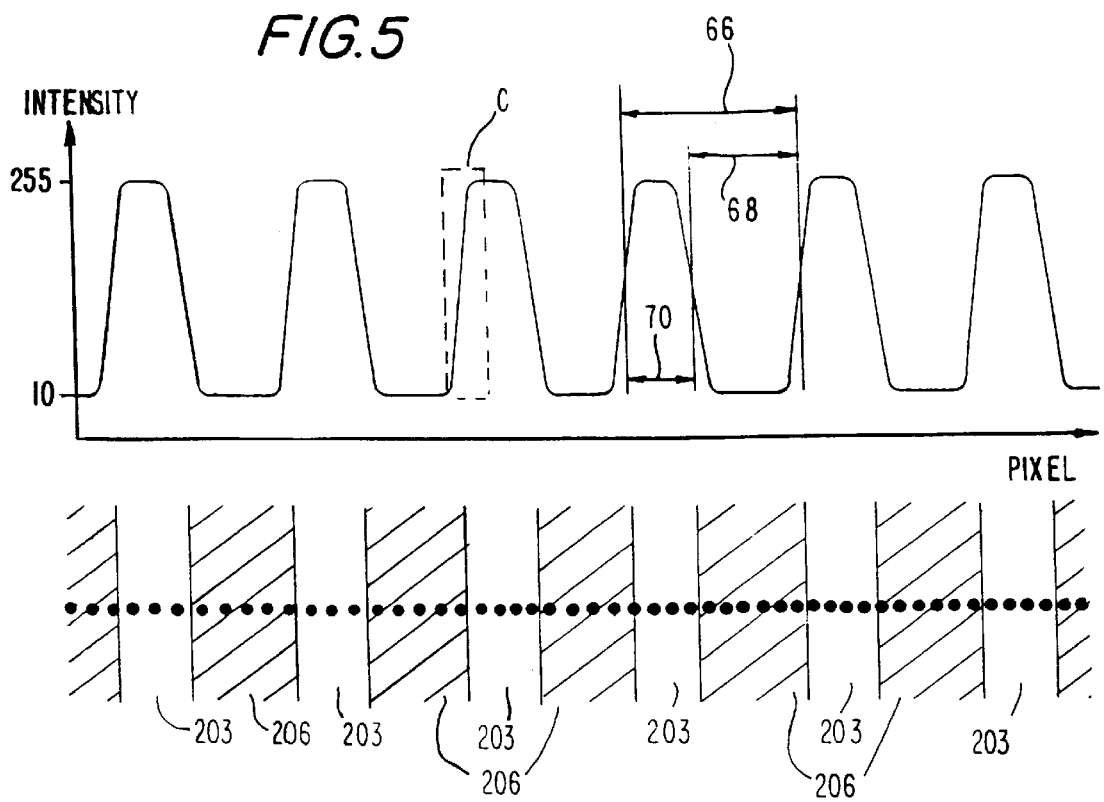
FIG. 5 is a graph of pixel intensities along with a diagram of an aperture grill to which reference will be made in explaining the generation of an image signal.

The graph of FIG. 5 depicts the light intensity values of a line of pixels which represent a portion of an aperture grill. Below the pixel versus intensity graph is the corresponding cross section of the aperture grill upon which the discrete areas imaged by the pixels have been superimposed. The light intensity value of each pixel can range between 0, corresponding to absolute darkness, and 255, corresponding to bright light, varying smoothly between the two extremes. Slits in the aperture grill are represented by pixels having large intensity values (255) while ribbons are represented by pixels having small intensity values (10). As illustrated, the slits 203 appear to the camera as areas of high light intensity, and thus pixels imaging slit areas have high light intensity values. In contrast, the ribbons 206 appear to the camera as areas of low light intensity, and thus pixels imaging ribbon areas have low light intensity values.

The shared edge of a slit and an adjacent ribbon is estimated as the point on the curve of FIG. 5 which has a light intensity value approximately halfway between the two extreme intensity values. In this example, the halfway point has an intensity value on the order of 127.5 (=0.5×255). The location of an edge is roughly approximated by the coordinates of the pixel having an intensity value nearest to the halfway point. A more accurate estimate is obtained by calculating the distance between a nearby pixel and the halfway point.

A pitch 66 is calculated as the distance between two halfway points which approximate the locations of two adjacent corresponding edges. A ribbon width 68 is calculated as the distance between two halfway points which approximate the locations of the two edges of a ribbon. Further, a slit width 70 is calculated as the distance between two halfway points which approximate the locations of two edges of a slit.

Camera 29 provides a plurality of lines of pixels to interface 48 which selectively distributes the pixels to each of buffer memories 50 and 54. In turn, buffer memories 50 and 54 provide pixels to each of convolvers 52 and 56. Each convolver 52 and 56 performs a convolution operation on a group of pixels and together provide a look-up table memory address to access a memory location in look-up table memory 64. The convolution operation and its interrelationship with the values stored in look-up table memory 64 will be explained in conjunction with FIG. 6.

Figure 6:
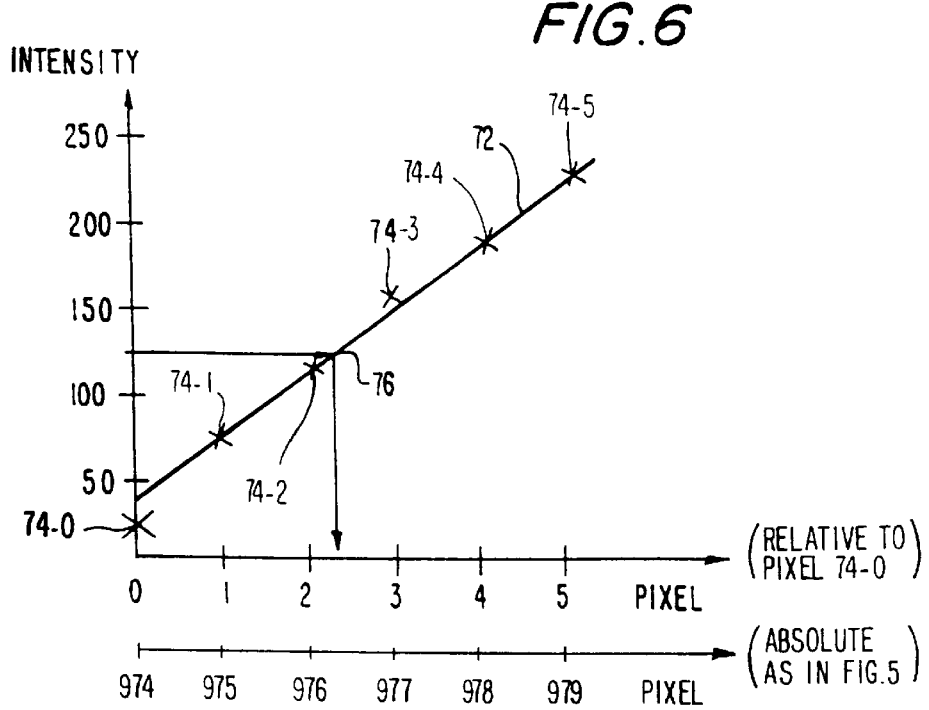
FIG. 6 is a graph of pixel intensities to which reference will be made in explaining the derivation of a linear relationship from a set of light intensity values.

FIG. 6 illustrates a portion C of the curve in FIG. 5 comprised of six individual pixels 74-0, 74-1, 74-2, 74-3, 74-4, and 74-5, collectively "pixels 74." The graph of FIG. 6 includes two horizontal axes: an upper axis indicating pixel position relative to pixel 74-0 and a lower axis indicating actual pixels corresponding to those of FIG. 5. Each of pixels 74 is produced by one of a series of adjacent light-sensitive sensors in camera 29 during a single scan by the camera. Pixels 74 have consecutively increasing intensity values which is characteristic of a ribbon-slit edge. Conversely, consecutive pixels having decreasing intensity values is characteristic of a slit-ribbon edge. The group of pixels 74 is approximated by line 72 which is obtained by performing a linear regression operation on the six pixels 74. The line 72, in particular the segment of line 72 extending from pixel 74-0 to pixel 74-5, thus approximately describes the change in light intensity that occurs over the area represented by the six pixels 74.

The six pixels 74 exhibit a range of light intensity values from a low of about 20 to a high of about 225. Since a light intensity value of a halfway point, for example 127.5, must exist between the two extreme intensity values of the six pixels 74, it is surmised that an edge is spanned by the six pixels 74. An approximate location of the halfway point is calculated simply by substituting the value 127.5 into the linear equation which defines line 72 to produce the corresponding pixel coordinate. The point on line 72 having an intensity value of 127.5 is identified by reference numeral 76, and has a pixel coordinate of 2.3, relative to pixel 74-0.

Once the pixel coordinate of point 76 is calculated, the distance (in pixel units) between point 76 and the pixels can be determined. For example, point 76 is a distance of 1.3 pixels from pixel 74-1, 0.3 pixels from pixel 74-2, 0.7 pixels from pixel 74-3, and 1.7 pixels from pixel 74-4.

In a preferred embodiment, line 72 is defined by the equation I=mP+b, where I is light intensity, m is the slope, P is pixel coordinate relative to pixel 74-0, and b is the offset from zero intensity. The six points 74 are expressed in (pixel coordinate, intensity) form as $(0, I_0)$ $(1, I_1)$, $(2, I_2)$, $(3, I_3)$, $(4, I_4)$, and $(5, I_5)$. By substituting each of points 74 into the general equation for a line, such as line 72, a set of six equations is obtained (not shown here). By simultaneously solving these six equations, six specific coefficients are derived, from which expressions for m and b are obtained in terms of the intensity values of the six pixels 74. Specifically, slope $m = -0.1429I_0 - 0.0857I_1 - 0.0286I_2 + 0.0286I_3 + 0.0857I_4 + 0.1429I_5$ and offset $b = 0.5238I_0 + 0.3810I_1 + 0.2381I_2 + 0.0952I_3 - 0.0476I_4 - 0.1905I_5$. Assuming a left-to-right scan, the slope m will have a positive value if the six pixels 74 span a ribbon-slit edge and a negative value if the six pixels 74 span a slit-ribbon edge.

The convolution operation of convolver 52 is preferably a calculation of the slope m as described above. In a preferred embodiment, convolver 52 is preset with the six coefficients, −0.1429, −0.0857, −0.0286, 0.0286, 0.0857, and 0.1429, which are needed to calculate the value of the slope m of a group of six pixels. Presented with six consecutive pixels 74 by one of buffer memories 50 and 54, convolver 52 calculates the corresponding value of slope m. Following the same procedure, convolver 56 calculates the value of offset b corresponding to the six pixels 74. In this manner, each group of six pixels 74 is approximated by a line defined by a particular combination of slope m and offset b values.

The two values m and b, corresponding to a particular group of six pixels 74, are provided by convolvers 52 and 56, respectively, to look-up table memory 64. Additionally, location coordinates for a reference pixel from the particular group of six pixels 74 are provided. Preferably, the first pixel (e.g. 74-0) of a group of six pixels 74, is utilized as the reference pixel. The location coordinates define the location of the reference pixel, and thus the group of pixels, in an acquired image. By repeating the above-described procedure, convolvers 52 and 56 process lines of pixel data supplied by buffer memories 50 and 54 in groups of six pixels at a time.

In a preferred embodiment, a first group of six pixels is defined from a line of pixels as the first six adjacent pixels starting at one end of the line of pixels. Subsequent groups of six pixels are defined as five adjacent pixels of the preceding group plus the next adjacent pixel. Thus, each group of pixels is offset by one pixel from its two neighboring groups.

As an example, a line defined by eight adjacent pixels (pixels 1–8) would include three consecutive groups of six pixels (pixels 1–6, pixels 2–7, pixels 3–8). As a result, each aperture grill edge is typically spanned by five consecutive groups of six pixels. In the case where a pixel is exactly aligned with a particular edge, six consecutive groups of six pixels span the edge. As an example, by extrapolating the absolute pixel scale of FIG. 6 in both directions, it can be seen that the halfway point 76 is spanned by five consecutive groups of pixels: pixels 972–977, pixels 973–978, pixels 974–979, pixels 975–980, and pixels 976–981. However, if halfway point 76 was exactly aligned with pixel 976, then it would be spanned by six consecutive groups of pixels: pixels 971–976, pixels 972–977, pixels 973–978, pixels 974–979, pixels 975–980, and pixels 976–981.

Given the known resolution of the values output by convolvers 52 and 56, the finite range of intensity values, and the fixed number of pixels approximated by each line, the different possible combinations of slope m and offset b values may be readily anticipated. From each anticipated combination of slope m and offset b values, the pixel distance between a reference pixel and the halfway point, located on the line defined by the particular combination of slope m and offset b values, can be calculated in units of pixels. This pixel distance is referred to as an edge offset value and represents the distance between the reference pixel and an edge.

If the reference pixel is defined as the first pixel from each group of pixels, then the edge offset values for each group spanning an edge range from zero to the total number (N) of pixels in the group minus one. An edge offset value of zero indicates that the first pixel is aligned with the edge while a value of N-1 indicates that the last pixel in the group is aligned with the edge. Edge offset values between zero and N-1 indicate that the edge lies between the first and last pixels at a distance equal to the edge offset value (in pixels units) from the first pixel. Each succeeding consecutive group of pixels spanning the same edge will necessarily have an edge offset value that is one pixel less than its immediately preceding neighboring group.

Look-up table memory 64 is pre-stored with edge offset values corresponding to possible combinations of slope m and offset b values. Since the maximum possible edge offset value is equal to the total number of pixels in the group minus one, the size of look-up table memory 64 is minimized. Each pair of slope m and offset b values serve as a look-up table memory address for look-up table memory 64. Upon receiving a look-up table memory address, look-up table memory 64 provides the corresponding pre-stored edge offset value to selector 62.

Alternatively, look-up table memory 64 may be pre-stored with edge offset values corresponding to a subset of the possible combinations of slope m and offset b values. When look-up table memory 64 receives addresses derived from combinations of slope m and offset b values outside this subset, it provides an out-of-range value to selector 62. In the preferred embodiment, this out-of-range value equals 255.

For each group of six pixels processed by convolvers 52 and 56, look-up table memory 64 supplies to selector 62 the location coordinates of the reference pixel in the group and either an edge offset value or an out-of-range value. If an out-of-range value is received, that value and its corresponding coordinates are discarded. From the set of five or six consecutive groups of pixels which span a particular edge, selector 62 selects the group having the minimum edge offset value. The edge offset value of the selected group is provided to edge memory 58 and its location coordinates are provided to edge memory 60.

FIGS. 7A–D are waveform diagrams which are helpful in explaining the preferred operation of selector 62. In FIG. 7A, as in FIG. 5, the vertical axis represents intensity and the horizontal axis represents pixels. FIG. 7A presents a graphical representation of a single slit in an aperture grill. The left and right edges of the slit are indicated by "X" marks 76 and 77, respectively. As the slit is scanned from left to right, pixels 82 and 86 are the pixels closest to marks 76 and 77 respectively. It should also be noted that groupings of six adjacent pixels, taken from left to right, that begin with any of points 78 fail to span either of edges 76 and 77.

In FIGS. 7B and 7C, the vertical axis represents edge offset values and the horizontal axis represents pixels; however, the figures are not to scale. FIG. 7B presents a graphical representation of the edge offset values read from look-up table memory 64 corresponding to the pixels of FIG. 7A in which the left-most (first) pixel of each group is the reference pixel for that group. Points 78 all have the same intensity, an out-of-range value equal to 255. Groupings of six adjacent pixels, taken from left to right, that begin with any of points 80, 82, 84, or 86 span one of edges 76 and 77. Each of points 80, 82, 84, and 86 is labelled with its respective edge offset value. As illustrated, points 82 and 86 are 0.5 pixel units away from edges 76 and 77, respectively.

FIGS. 7C and 7D illustrate a preferred method of selecting pixels having minimum edge offset values. FIG. 7C is a copy of FIG. 7B shifted to the left by one pixel. By appropriately buffering the stream of edge offset values supplied thereto, selector 62 shifts the input stream to the left by one pixel and subtracts the shifted input stream from the unshifted input stream. In effect, the values of FIG. 7C are subtracted from the values of FIG. 7B. The negative results of this subtraction correspond to pixels having a minimum edge offset value.

The result of this subtraction operation is illustrated in FIG. 7D, wherein negative results are mapped to binary 1 and all others to binary 0. Accordingly, points 92, having a value of binary 0, correspond to the aggregate of points 78, 80, and 84. Points 88 and 90, having values of binary 1, correspond to points 82 and 86, respectively. Thus, the point closest to each edge (e.g., points 82 and 86), when approaching from the left, is identified and selected (as indicated by points 88 and 90).

Selector 62 repeats the above-described selection process for each set of five or six groups of pixels spanning each edge of the aperture grill. Edge memories 58 and 60 store the offset value and location coordinates, respectively, of each of the selected pixel groups. In the preferred embodiment, as mentioned above, the location coordinates identify the first pixel of a group. The selected and stored location coordinates and offset values thus describe the location of each edge of the aperture grill with sub-pixel accuracy. The location defined by a particular set of location coordinates and offset values will be referred to hereinafter as an edge point.

Figure 8:
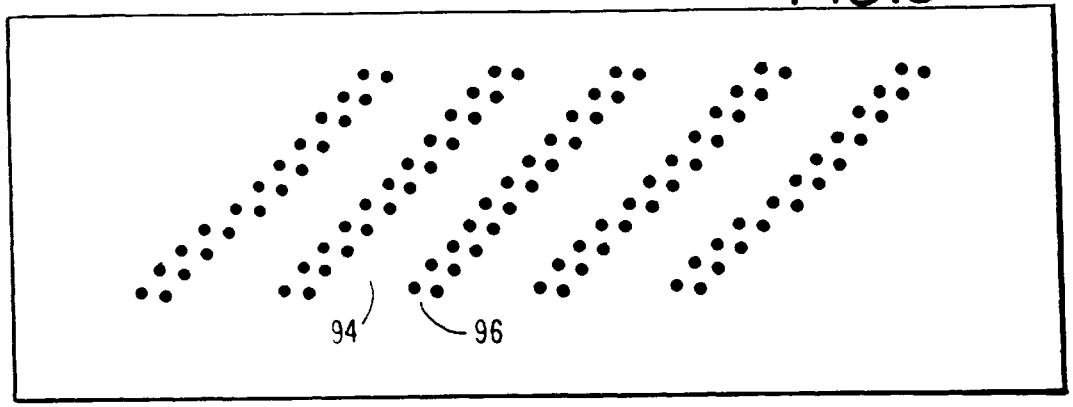
FIG. 8 is a diagram of pixels representing edges of an aperture grill.

FIG. 8 provides a graphical representation of edge location information stored in edge memories 58 and 60. Each edge of the aperture grill appears as a substantially straight line of edge points. Ribbon 94 and adjacent slit 96 are defined, respectively, by pairs of edge points which appear as two substantially straight lines of edge points. For example, ribbon 94 is defined by edge points 93 and 95. The lines of edge points appear slanted because the aperture grill moves between consecutive scans by the camera.

The above description of edge detection apparatus 47 is intended to illustrate and not limit the present invention. Each element of apparatus 47 is readily adaptable to process pixel groups and pixel data organized in a form other than 6×1 blocks. The interpolation of a more precise estimate of the location of an edge can be achieved by a number of straightforward variations on the linear regression operation described. For example, polynomial, sinusoidal, and other well-known techniques of curve-fitting may also be implemented with a pipelined arrangement of convolvers and memories to estimate the location of an edge. Variations on these techniques are contemplated to process lines of pixel data scanned oblique to the edge of an aperture grill. More precise interpolations are expected to be obtained through two-dimensional convolution operations which utilize a series of convolver and memory elements. Further, even greater precision may be obtained by repeating the scanning and interpolating processes for each edge and averaging together the interpolated results. This last method has the added benefit of removing errors introduced by irregular movements of the scanned aperture grill on an assembly line.

Figure 9:
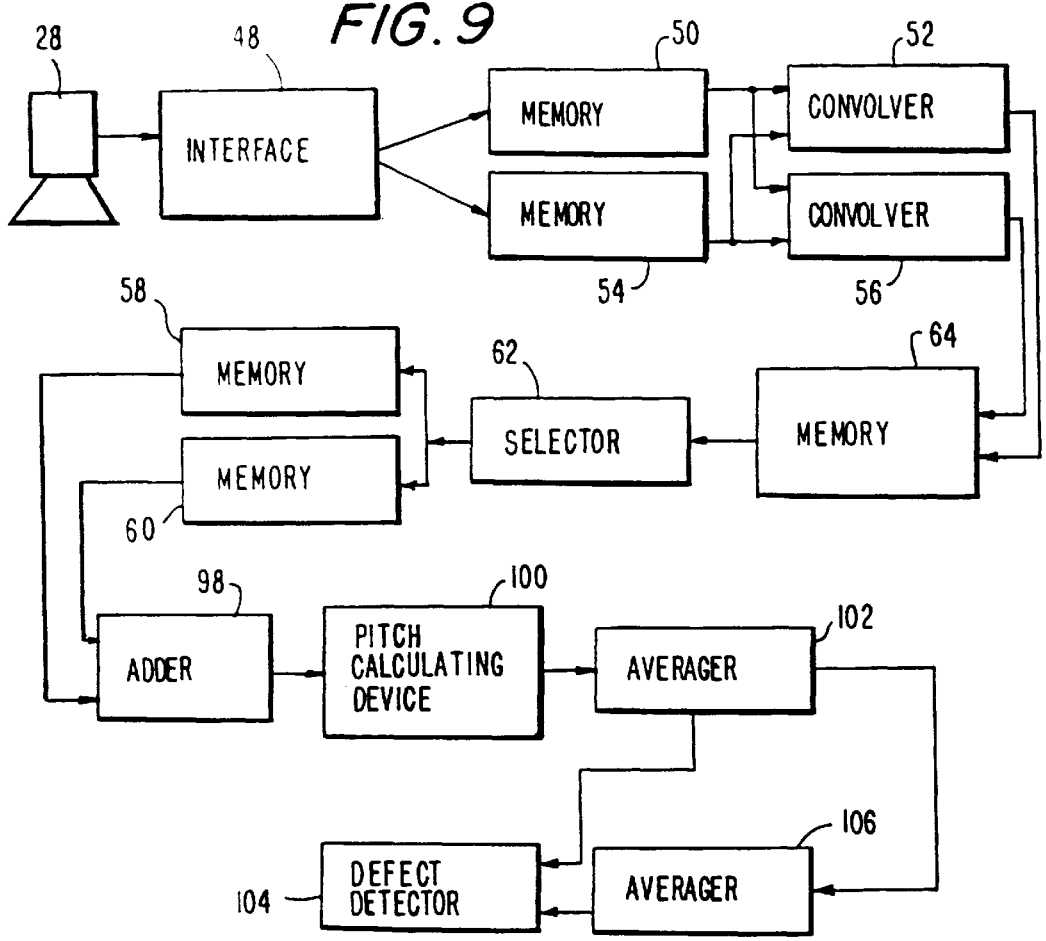
FIG. 9 is a block diagram of pitch defect detection apparatus according to another embodiment of the present invention.

A pitch defect detection apparatus according to another embodiment of the present invention is illustrated in FIG. 9. The pitch defect detection apparatus substantially includes the elements of the edge detection apparatus of FIG. 4 as previously described, and further includes an adder 98, a pitch calculating device 100, averagers 102 and 106, and a defect detector 104.

Adder 98 is coupled to each of edge memories 58 and 60 to receive from the memories an edge offset value and corresponding location coordinates for a particular edge, respectively. Adder 98 sums the edge offset value and location coordinates to produce edge point coordinates of an edge point, identifying the location of an edge.

Adder 98 is coupled to pitch calculating device 100 and supplies the pitch calculating device with sets of edge point coordinates. Pitch calculating device 100 stores at least one set of edge point coordinates and calculates the distance between stored coordinates, which identify the location of one edge, and a subsequent set of edge point coordinates, which identify the location of an adjacent corresponding edge. The calculated distance represents a pitch value, and thus corresponds to the pitch between two adjacent corresponding edges.

Averager 102 is coupled to and receives pitch values from pitch calculating device 100 and is adapted to average together multiple pitch values, corresponding to a single pitch, to obtain a local average pitch value. By averaging a number of pitch values for the same pitch, pitch measurement errors resulting from assembly-line vibrations are minimized. Averager 102 is further coupled to defect detector 104 and averager 106.

Averager 106 receives local average pitch values from averager 102 and operates to average together multiple local average pitch values, corresponding to a number of pitches, to obtain a global average pitch value. Preferably, the global average pitch value is calculated from the set of local average pitch values which, in turn, are derived from the set of all pitches of an aperture grill. Averager 106 is coupled to defect detector 104 and provides global average pitch values thereto.

Defect detector 104 receives local average pitch values from averager 102 and determines whether a particular local average pitch value indicates a pitch defect. Local average pitch values are compared to a predetermined range of pitch values, and if a particular value falls outside that range, the presence of a defect is noted. The exact ranges of acceptable local average pitch values will vary according to the specific inspection requirements of the particular application. In aperture grill manufacturing, it is preferred that local average pitch values vary less than three percent from a target local pitch value.

Similarly, defect detector 104 receives global average pitch values from averager 106 and determines whether a particular global average pitch value indicates a pitch defect. The global average pitch value is compared to each of the local average pitch values. If the difference between the compared pitch values exceeds a predetermined threshold, then it is determined that a defect exists.

Figure 10A:
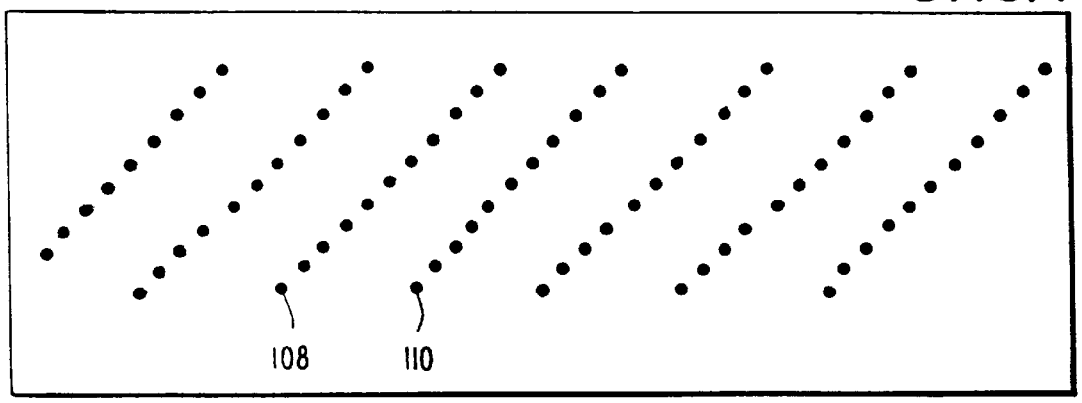
FIGS. 10A and 10B are diagrams of pixels representing edges of an aperture grill.

The operation of the pitch defect detection apparatus will further be described with reference to FIGS. 10A–10B. FIG. 10A illustrates a series of parallel, regularly-spaced lines comprised of edge points. These lines represent adjacent corresponding edges of an aperture grill. For example, edge points 108 and 110 represent the right (or left) edges of two adjacent slits (or ribbons). As illustrated, the pitches of the pairs of adjacent lines are substantially equal.

In operation, adder 98 receives from edge memories 58 and 60 the edge offset value and location coordinates for edge point 108 and produces edge point coordinates for edge point 108. The edge point coordinates of edge point 108 are supplied to pitch calculating device 100. In a similar manner, adder 98 produces edge point coordinates for edge point 110 and supplies these coordinates to the pitch calculating device.

Pitch calculating device 100 stores edge point coordinates of edge points 108 and 110 and calculates the distance between them. This distance, which is the pitch between edge points 108 and 110, is supplied to averager 102 which averages the calculated pitch between edge points 108 and 110 with other pitches calculated for the same two edges to produce an average width value. For example, the pitch of points 109 and the pitch of points 111 are averaged with the pitch between points 108 and 109 to a produce a local average pitch value.

Defect detector 104 compares the local average pitch value produced by averager 102 to a predetermined range of values to determine the presence of a local pitch defect. If the local average pitch value is within the predetermined range of values, then no local pitch defect is indicated. Otherwise, defect detector 104 may store the defective pitch value, the edge point coordinates of the corresponding edges, or other information regarding the defective pitch. Additionally, the defect detector may increment a defect counter; or otherwise note the presence of a pitch defect.

Figure 10B:
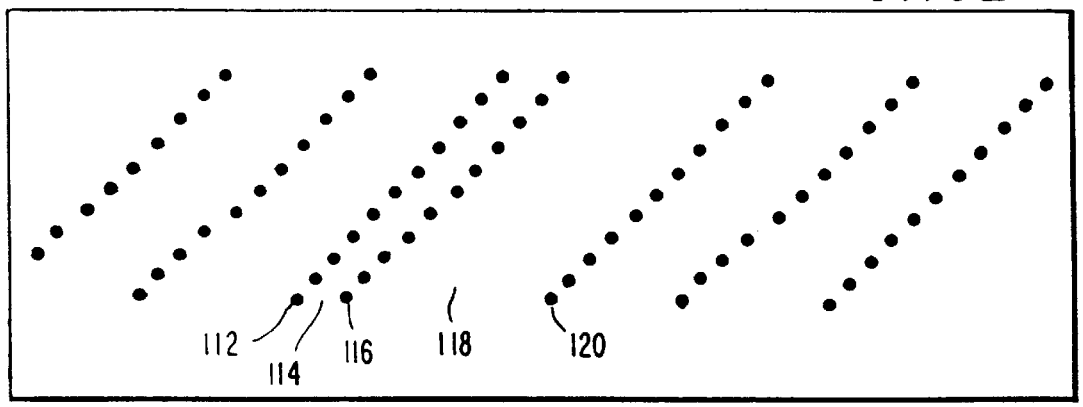

FIG. 10B illustrates a second section of the same aperture grill illustrated in FIG. 10A. In particular, a series of parallel, irregularly-spaced lines comprised of edge points are shown. As depicted, pitch 114, between edge points 113 and 116, is less than pitch 112, while pitch 118, between edge points 116 and 120, is greater than pitch 112. If defect detector 104 is provided with an appropriately small range of local average pitch values, for example pitch 112+/−3%, the defect detector will identify the local average pitch values of pitches 114 and 118 as being outside that range and therefore indicative of a defect.

Each of the local average pitch values for pitches 112, 114, and 118 is also supplied by averager 102 to averager 106. Averager 106 averages these local average pitch values with the local average pitch values for the pitches of the remainder of the aperture grill to produce a global average pitch value. As an example, the global average pitch value may equal pitch 112+/−10%. This global average pitch value is provided to defect detector 104. Assuming a defect threshold of only 5%, defect detector 104 determines that a defect exists when it compares this global average pitch value with pitch 112.

Figure 11:
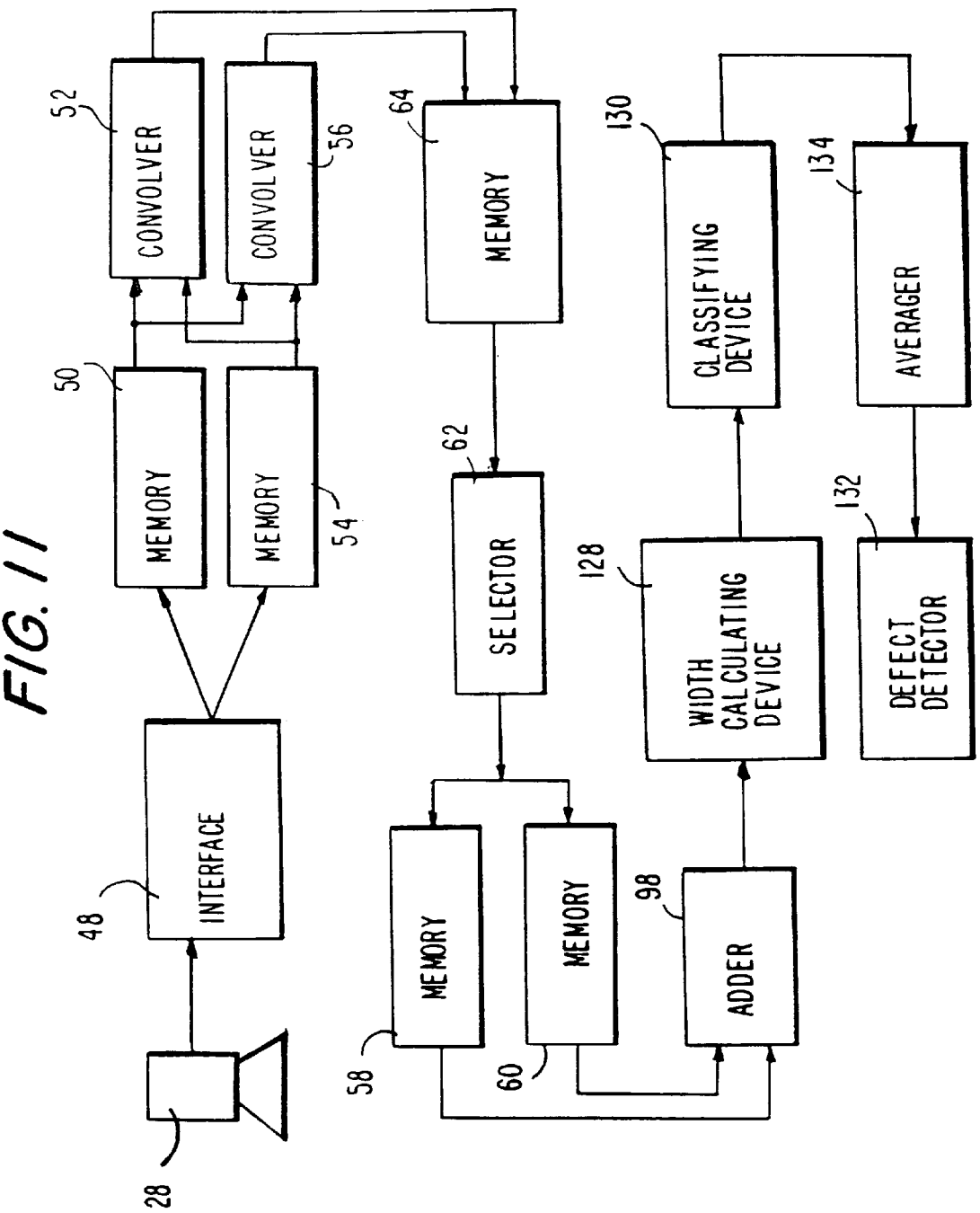
FIG. 11 is a block diagram of width defect detection apparatus according to another embodiment of the present invention.

According to another embodiment of the present invention, a width defect detection apparatus is illustrated in FIG. 11 and substantially includes the elements of the edge detection apparatus of FIG. 4 as previously described. The width defect detection apparatus further includes an adder 98, a width calculating device 128, a classifying device 130, an averager 130, and a defect detector 132.

Adder 98 has the same structure and function as adder 98 which is included in the pitch defect detection apparatus described above. Adder 98 supplies width calculating device 128 with sets of edge point coordinates. The width calculating device stores at least one set of edge point coordinates and calculates the distance between the stored coordinates, identifying the location of one edge, and a subsequent set of edge point coordinates which identify the location of an adjacent edge. The calculated distance, a width value, thus corresponds to the width between two edges.

Classifying device 130 is coupled to width calculating device 128 to receive width values therefrom and to classify each width value as corresponding either to a ribbon or to a slit. Classifying device 130 stores predetermined ranges of width values for ribbons and slits, respectively. Individual width values are compared to the stored ranges to determine whether a particular width value is characteristic of a ribbon or a slit so as to be classified as either a calculated ribbon width or a calculated slit width. The classifying device 130 selectively provides calculated ribbon widths, calculated slit widths or both to averager 134.

Averager 134 receives width values from classifying device 130 and averages together multiple width values, corresponding to a single ribbon or slit, to obtain an average width value. By averaging a number of width values for the same ribbon or slit, width measurement errors resulting from assembly-line vibrations are minimized.

Defect detector 132 is coupled to and receives average width values from averager 134 to determine therefrom whether a particular average width value indicates a width defect. Average width values for slits or ribbons are compared to a corresponding predetermined range of average width values, and if a particular value falls outside that corresponding range, the presence of a width defect is noted.

The operation of the width defect detection apparatus will further be described with reference to FIG. 8. Adder 98 receives from edge memories 58 and 60 the location coordinates and edge offset value for edge point 93, calculates its edge point coordinates, and supplies these coordinates to width calculating device 128. In a similar manner, adder 98 calculates and supplies the edge point coordinates of edge point 95 to width calculating device 128.

Width calculating device 128 stores the edge point coordinates of edge points 93 and 95 and calculates the distance between them. This distance, the width between edge points 93 and 95, is supplied to classifying device 130 which classifies this width as characteristic of a ribbon and supplies data representing this calculated ribbon width to averager 134. In a similar fashion, additional calculated ribbon widths are classified, selected, and then supplied to averager 134. Averager 134 averages the width between edge points 93 and 95 with other widths calculated for the same two edges to produce an average width value.

Defect detector 132 compares the average width value to a predetermined range of average width values to determine the presence of a width defect. If the average width value is within the predetermined range, then no width defect is found. Otherwise, defect detector 132 may store the defective width value, the edge point coordinates of the corresponding edges, or other information regarding the defective width; increment a defect counter; or otherwise note the presence of a width defect.

Figure 12:
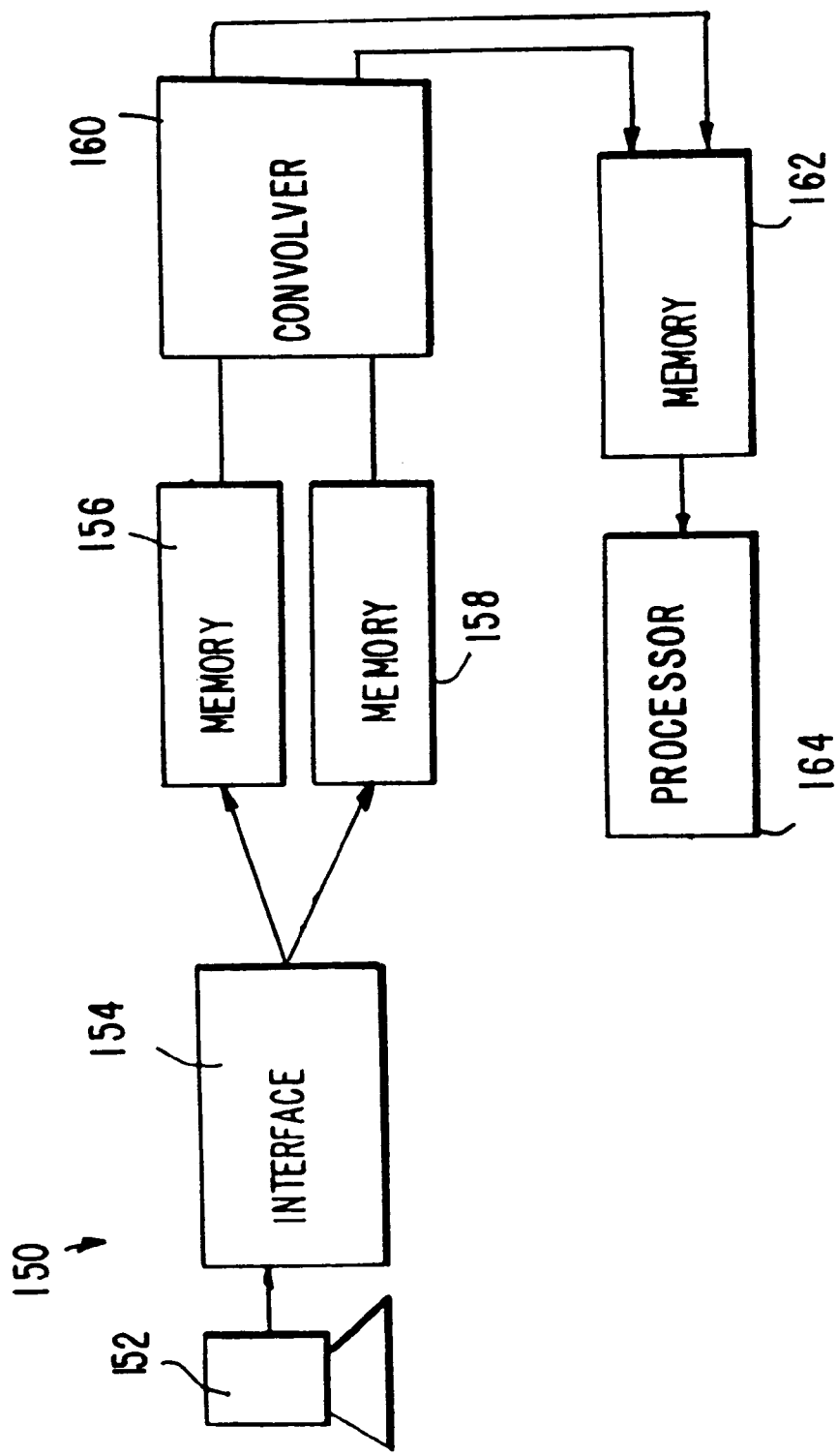
FIG. 12 is a block diagram of etch defect detection apparatus according to an embodiment of the present invention.

According to one embodiment of the present invention, one or more cameras from camera array 28 and processor 34 of FIG. 3 form an etch defect detection apparatus 150, as illustrated in detail in FIG. 12, for inspecting aperture grills or the like. The etch defect detection apparatus 150 is comprised of camera 152; interface 154; buffer memories 156 and 158; convolver 160; memory array 162; and processor 164. Etch defect detection apparatus 150 has a pipelined architecture, facilitating the storage, processing, and compression of large quantities of pixel data at assembly-line speeds. An automated visual inspection system incorporating the etch defect detection apparatus of the present invention quickly and efficiently identifies defects in an inspected object and thus alleviates the inspection bottleneck which has substantially limited prior art manufacturing efforts.

Camera 152 is a conventional scanning device, such as a Dalsa linescan camera that generates one line of image data formed of 4096 pixels. Preferably, lines of image data are acquired at approximately 50 micron intervals along each aperture grill. Each sensor of the Dalsa camera has an 8×8 micron resolution resulting in an overall scan width of 32.768 mm. The Dalsa camera acquires 3300 lines per second to produce 13.5M pixels of information per second. Interface 154 is coupled to and receives lines of pixel data from camera 152 and is also connected to each of buffer memories 156 and 158 to selectively provide each buffer memory with lines of pixel data. Buffer memories 156 and 158 serve as buffers to store and provide blocks of pixel data to convolver 160.

In a preferred embodiment, interface 154 alternately provides a group of lines of pixel data to each of buffer memories 156 and 158. After receiving each group, the respective memory provides the received group to convolver 160. Thus, buffer memories 156 and 158 operate to alternately store and read out pixel data and thereby serve as buffering storage for the acquired image. Alternatively, interface 154 and buffer memories 156 and 158 could be replaced by a single memory unit capable of simultaneously reading and writing stored information.

Convolver 160, also referred to as a "neighborhood multiplier accumulator", is a conventional convolver device coupled to memory array 162. Convolver 160 is preferably comprised of a series of multipliers and adders or, alternatively, may be comprised of one or more arithmetic units or microprocessors for producing the convolution result. Convolver 160 operates upon groups of pixels to highlight those pixels that may have imaged an etch defect on the inspected object. In a preferred convolution operation, the light intensity values of a group of pixels are multiplied by an array (or kernel) of values having dimensions similar to that of the group of pixels. The results of these multiplications are summed to produce a single convolution result, a weighted sum, which is assigned to the center pixel of the group. A preferred kernel is one that identifies those pixels that have imaged light intensity transitions occurring perpendicular to the ribbons and slits of the grill, discerning them from the set of pixels imaging the grill.

Memory array 162 is a conventional memory device coupled to convolver 160 and processor 164. Array 162 receives and stores the convolution results produced by convolver 160. Processor 164, a data processing device such as an Intel 80486 microprocessor-based system, analyzes the convolution results that are stored in array 162 to determine the existence, location and size of etch defects on the grill being inspected.

Figure 1B:
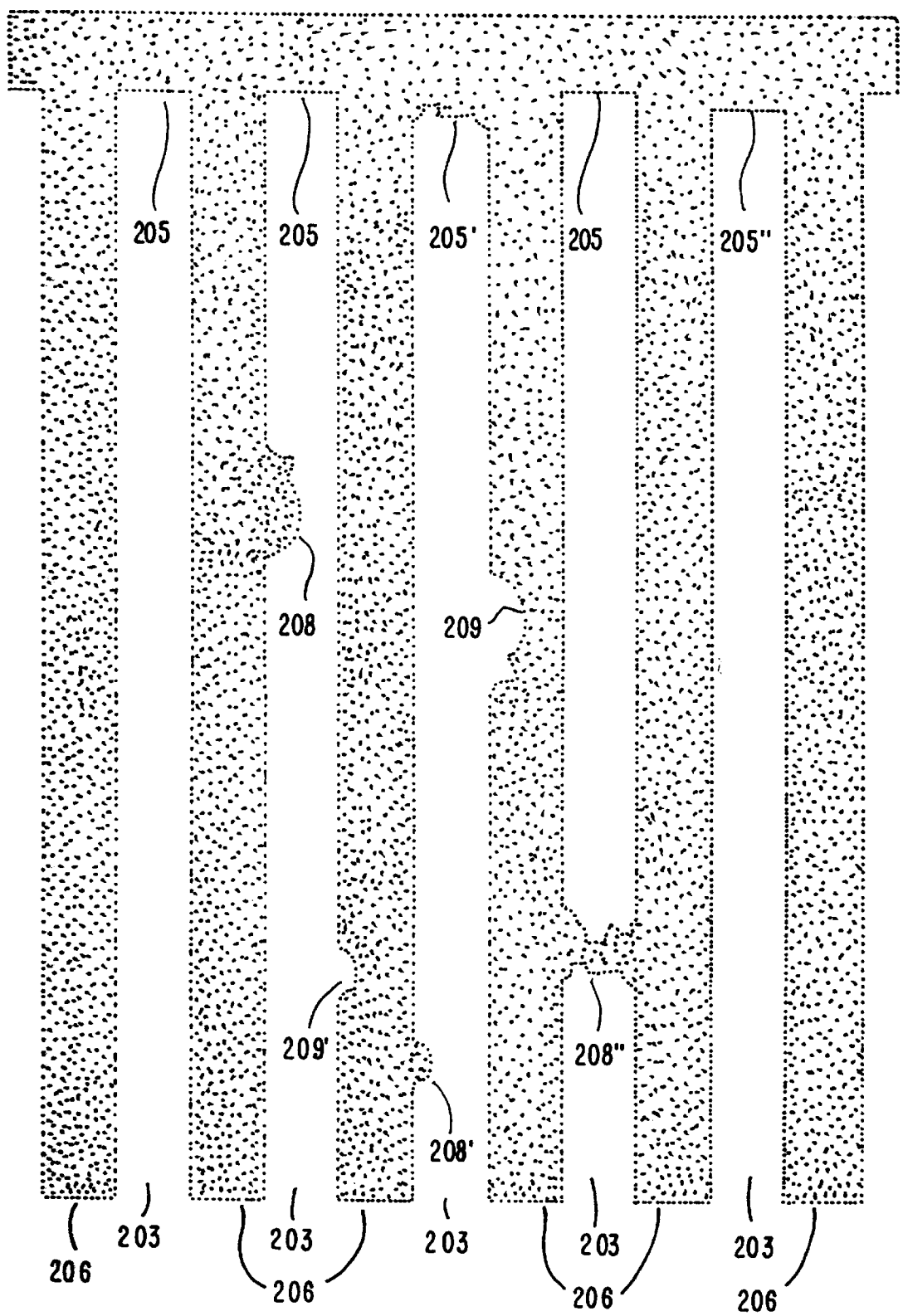
FIGS. 1B, 1C, and 1D are diagrams of portions of the aperture grill of FIG. 1A.
Figure 1C:
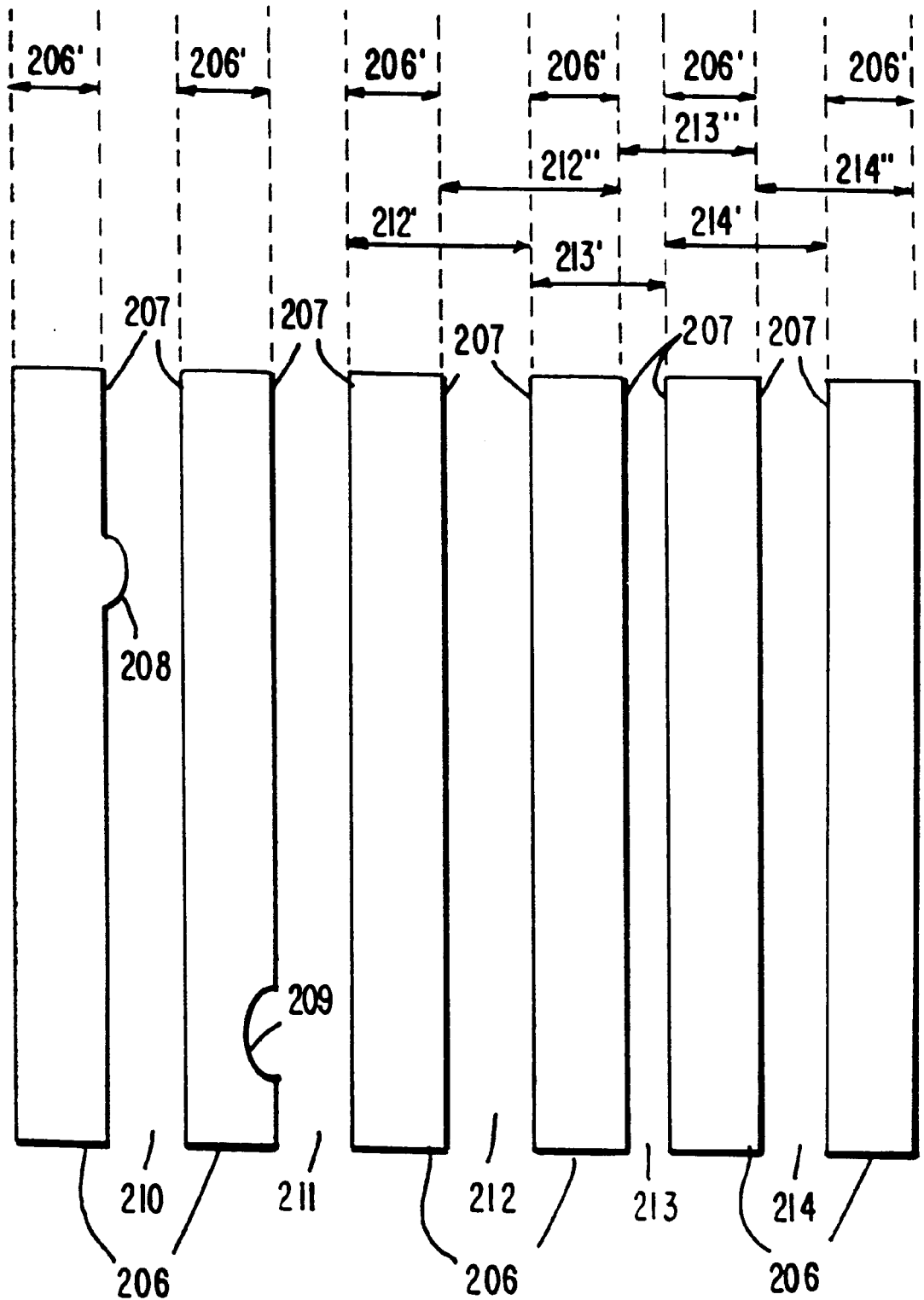
Figure 1D:
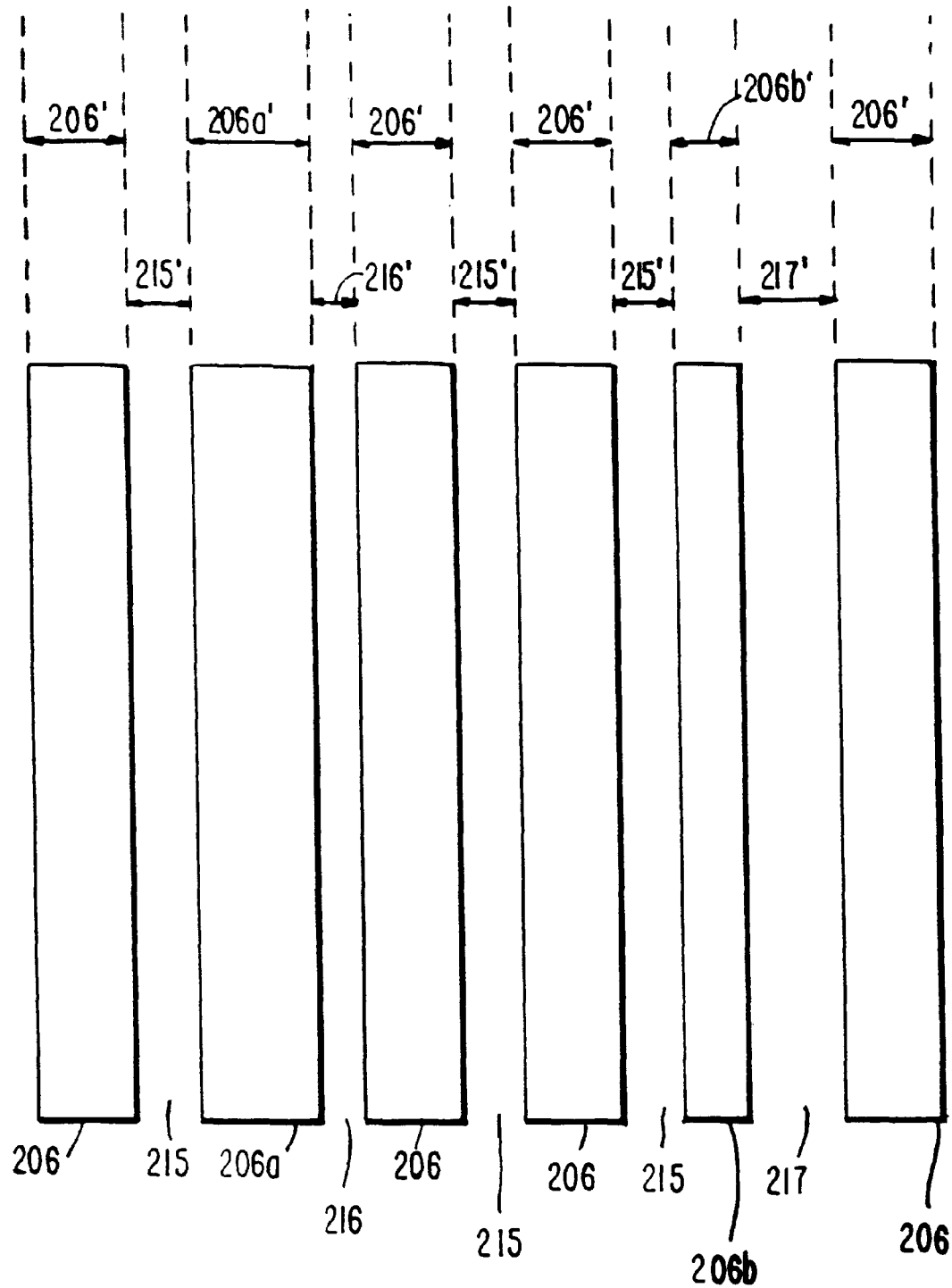
Figure 13:
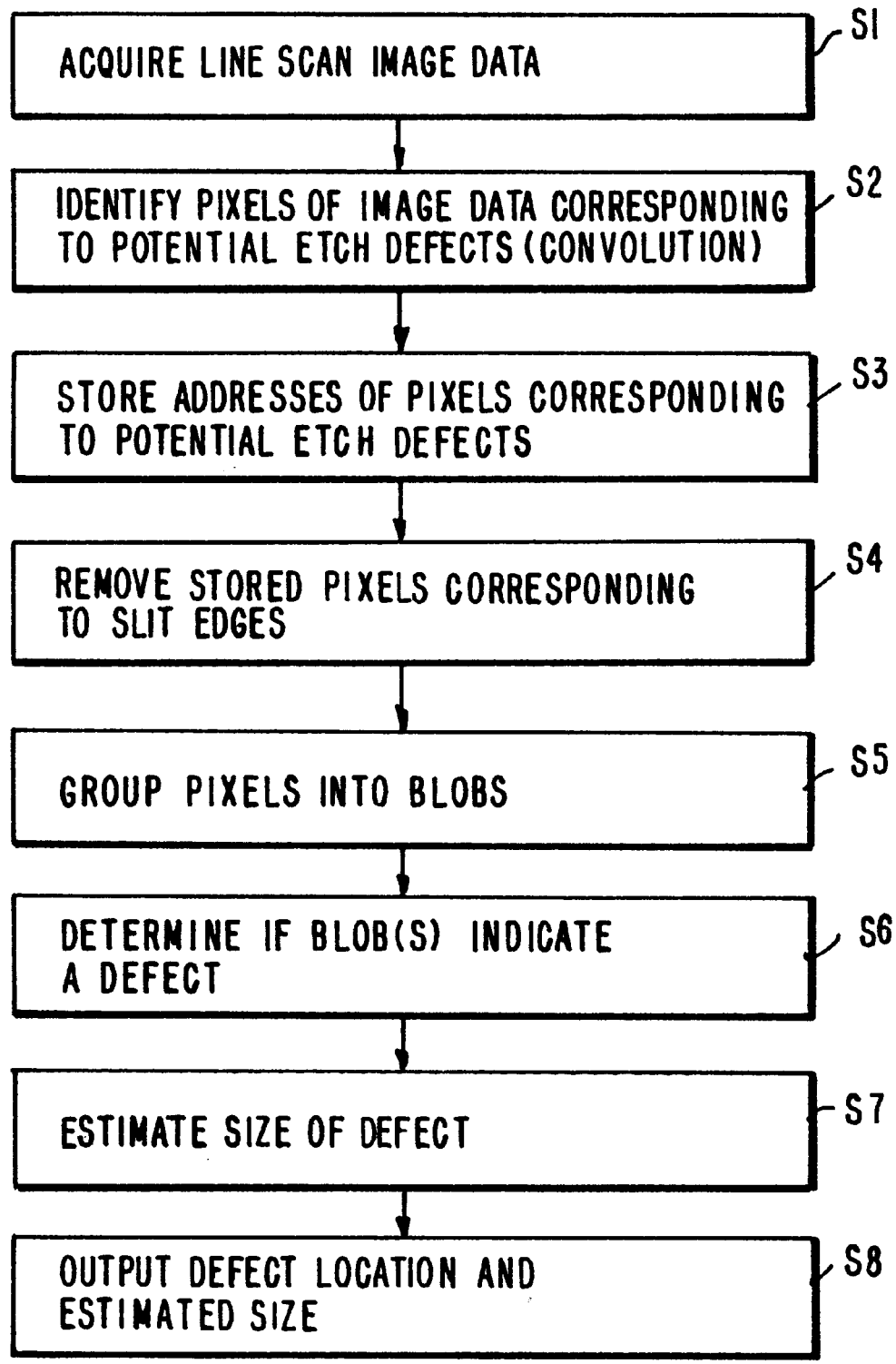
FIG. 13 is a flow chart to which reference will be made in describing an operation of the etch defect detection apparatus of FIG. 12.

A preferred mode of operation of etch defect detection apparatus 150 is illustrated in the flowchart of FIG. 13. In step S1, camera 152 scans an aperture grill having a series of alternating ribbons and slits, in a direction substantially parallel to the orientation of the ribbons and slits. Light shining through the bottom surface of the aperture grill creates an image projected to the camera as substantially continuous bands of light, dark, or shades of grey. Such an image of a portion of an aperture grill is provided in grey in FIG. 14, which substantially corresponds to the grill of FIG. 1B.

Figure 14:
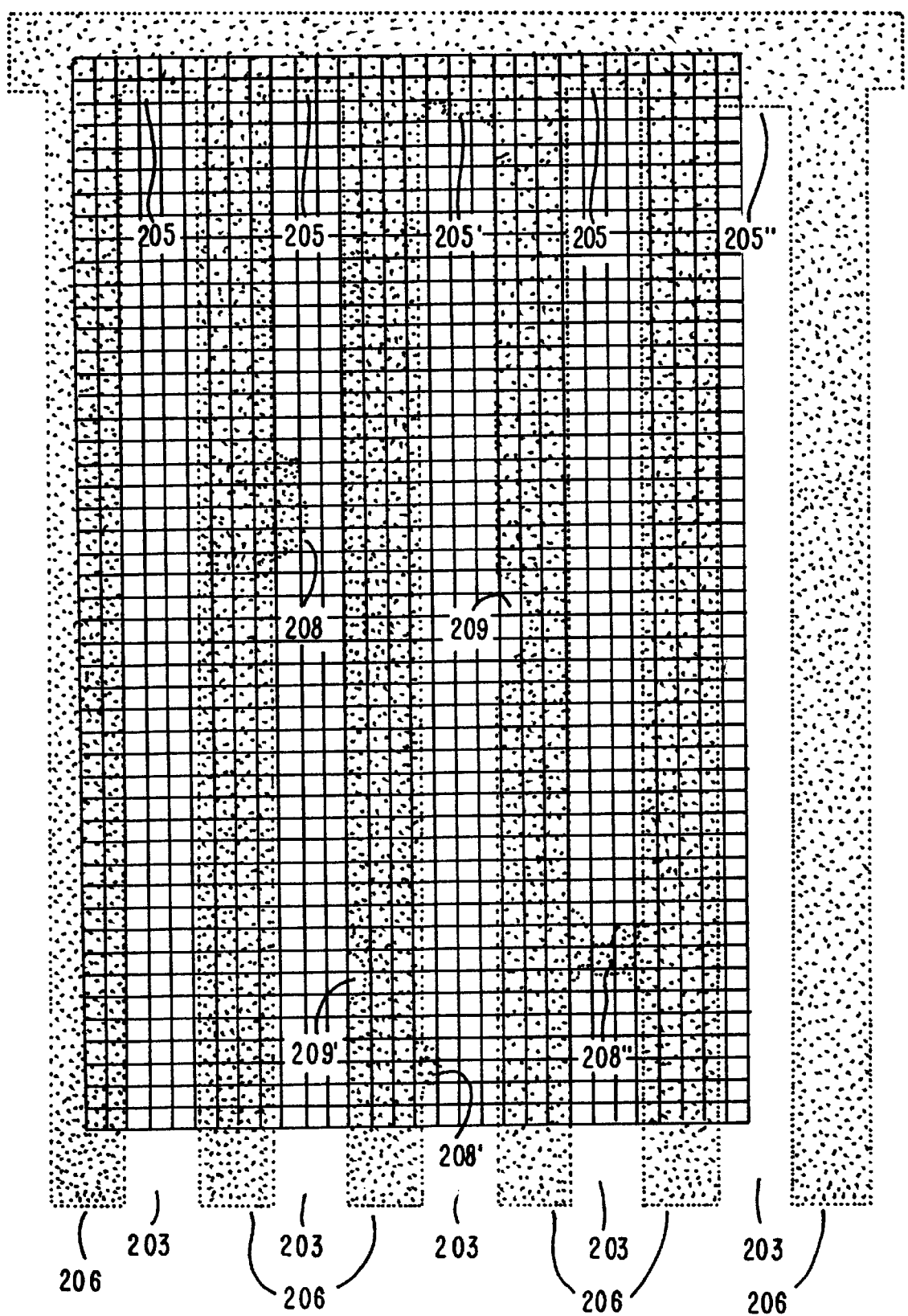
FIG. 14 is a diagram of a portion of an aperture grill overlayed with a grid of sensor imaging areas.

Each sensor of camera 152 images a defined region of the aperture grill which can be generally referred to as a "sensor imaging area." The aperture grill of FIG. 14 is shown overlayed with a uniform grid of sensor imaging areas. Each "box" formed by the grid designates an area of the aperture grill that is imaged by a particular sensor. Each sensor of camera 152 produces a light intensity value corresponding to the amount of light present in that sensor's sensor imaging area. For example, FIGS. 15A and 15B illustrate etch defects 208 and 209 of FIG. 14, respectively, on which appropriate light intensity values according to a linear 0–255 (dark-to-light) scale are superimposed upon the pixel imaging areas. The light intensity value data is routed by interface 154 to buffer memories 156 and 158 for temporary storage.

In step S2, convolver 160 reads the light intensity value data corresponding to the images acquired by the pixels of camera 152 from memories 156 and 158. Through a convolution operation, data that may represent an etch defect in the aperture grill are identified. Preferably, convolver 160 utilizes a 5×3 (5-by-3) convolution kernel, designed to accentuate abrupt interruptions in the otherwise continuous ribbons and slits, to perform the convolution operation. A typical form of such an interruption is a light intensity transition extending horizontally. Such a transition can be produced by defects in the ribbons, such as defects 208, 208', 208", 209, 209', or by the slit ends 205, 205', and 205", as illustrated in FIG. 14.

As an example, for tapes extending vertically, as in FIG. 14, in conjunction with a convolution operation that proceeds in a direction substantially parallel to the tapes, an advantageous 5×3 convolution kernel is:

$$\begin{array}{ccccc} 1 & 1 & 1 & 1 & 1 \\ 0 & 0 & 0 & 0 & 0 \\ -1 & -1 & -1 & -1 & -1 \end{array}$$

This kernel serves to identify those pixels corresponding to sensor imaging areas disposed adjacent a light intensity transition that extends horizontally, e.g. a transition having a significant horizontal component. Specifically, the weighted sum calculated from the light intensity value data for such pixels using the above kernel will result in a relatively extreme value.

Applying the sample 5×3 kernel given above to the light intensity value data illustrated in FIGS. 15A and 15B, and assuming that the sensor imaging areas immediately adjacent the boundaries of the region illustrated have the same light intensity values as the corresponding boundary area, yields the directly corresponding table of convolution results given in FIGS. 15C and 15D, respectively.

Each entry in the tables reflects the result of convolving a 5×3 region of light intensity data, centered on the corresponding respective sensor imaging area, with the sample 5×3 kernel. For example, to calculate the entry in position (3,3) of the table in FIG. 15C, relative to the bottom left corner, the 5×3 block of light intensity data centered on the corresponding sensor imaging area in FIG. 15A:

$$\begin{array}{cccccc} 0 & 0 & 47 & 181 & 255 & 255 \\ 0 & 0 & 68 & 255 & 255 & 255 \\ 0 & 0 & 68 & 255 & 255 & 255 \end{array}$$

is subjected to the convolution operation with the 5×3 kernel above to produce the following calculation: $(1\times0)+(1\times0)+(1\times47)+(1\times181)+(1\times255)+(1\times255)+(0\times0)+(0\times0)+(0\times68)+(0\times255)+(0\times255)+(0\times255)+(-1\times0)+(-1\times0)+(-1\times68)+(-1\times255)+(-1\times255)+(-1\times255)=-95$. Each entry in the tables of FIGS. 15C and 15D is calculated in a similar manner from the appropriate set of light intensity data.

As shown in FIGS. 15C and 15D, the convolution operation assigns relatively extreme values, e.g. large positive or large negative values, to those pixels corresponding to sensor imaging areas adjacent horizontal light intensity transitions. Upon filtering the results of the convolution operation to retain the relatively extreme values, the set of pixels corresponding to these values can be identified. This set of pixels necessarily roughly corresponds to the locations of one or more horizontal light intensity transitions.

Figure 15F:
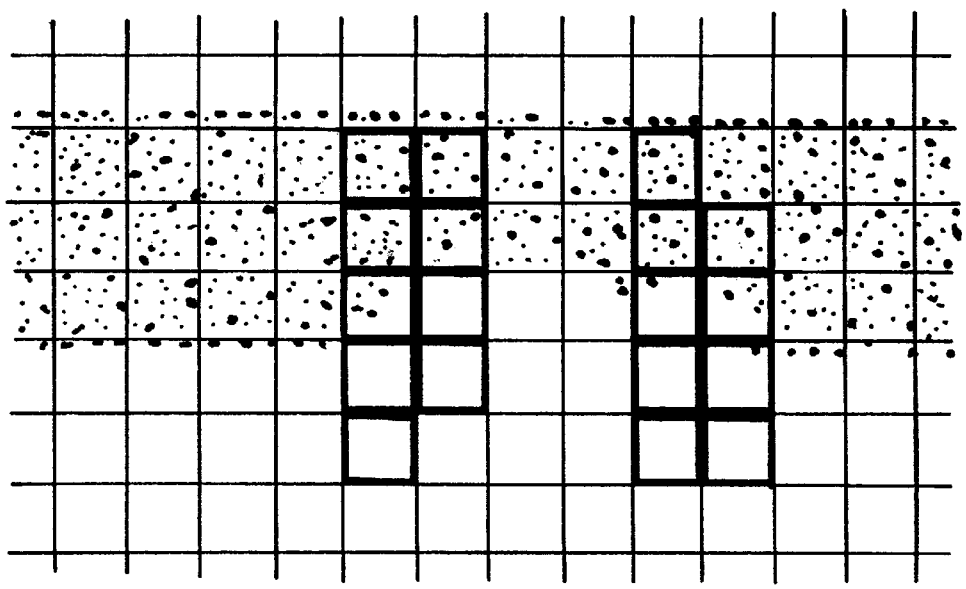
FIGS. 15E and 15F are diagrams of portions of FIG. 14 to which reference will be made in describing a convolution operation.
Figure 15E:
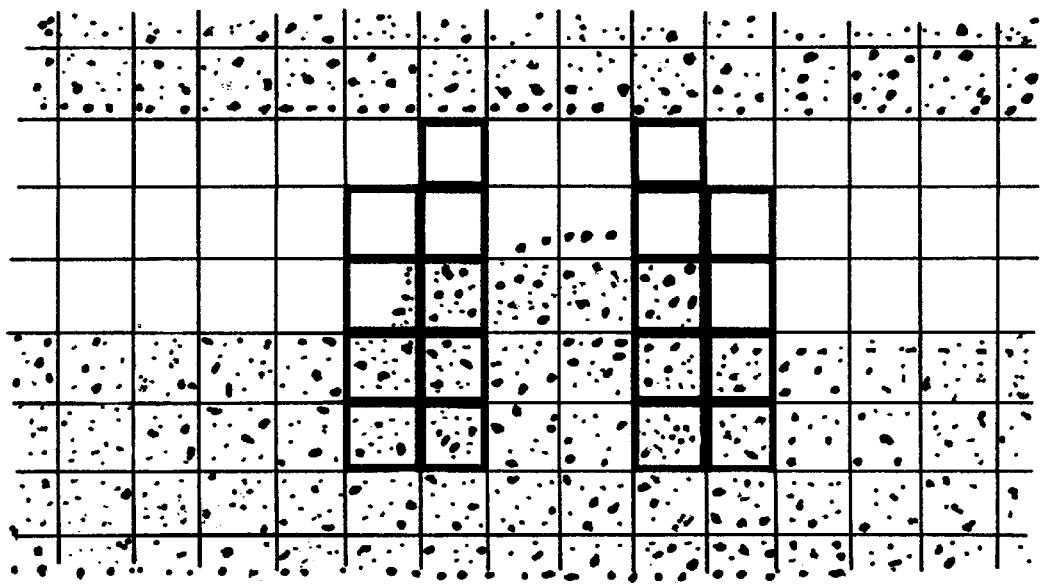

As an example, the convolution results tabulated in FIGS. 15C and 15D can be filtered to remove values less than 250 but greater than –250. Plotting the pixels corresponding to the remaining convolution values, on the sensor imaging area diagram of FIGS. 15A and 15B, but removing the superimposed light intensity values, yields the diagrams of FIGS. 15E and 15F, respectively. In each, the pixels roughly corresponding to a horizontal light intensity transition are portrayed with a "highlighted box", e.g. one having thicker boundaries.

Figure 16:
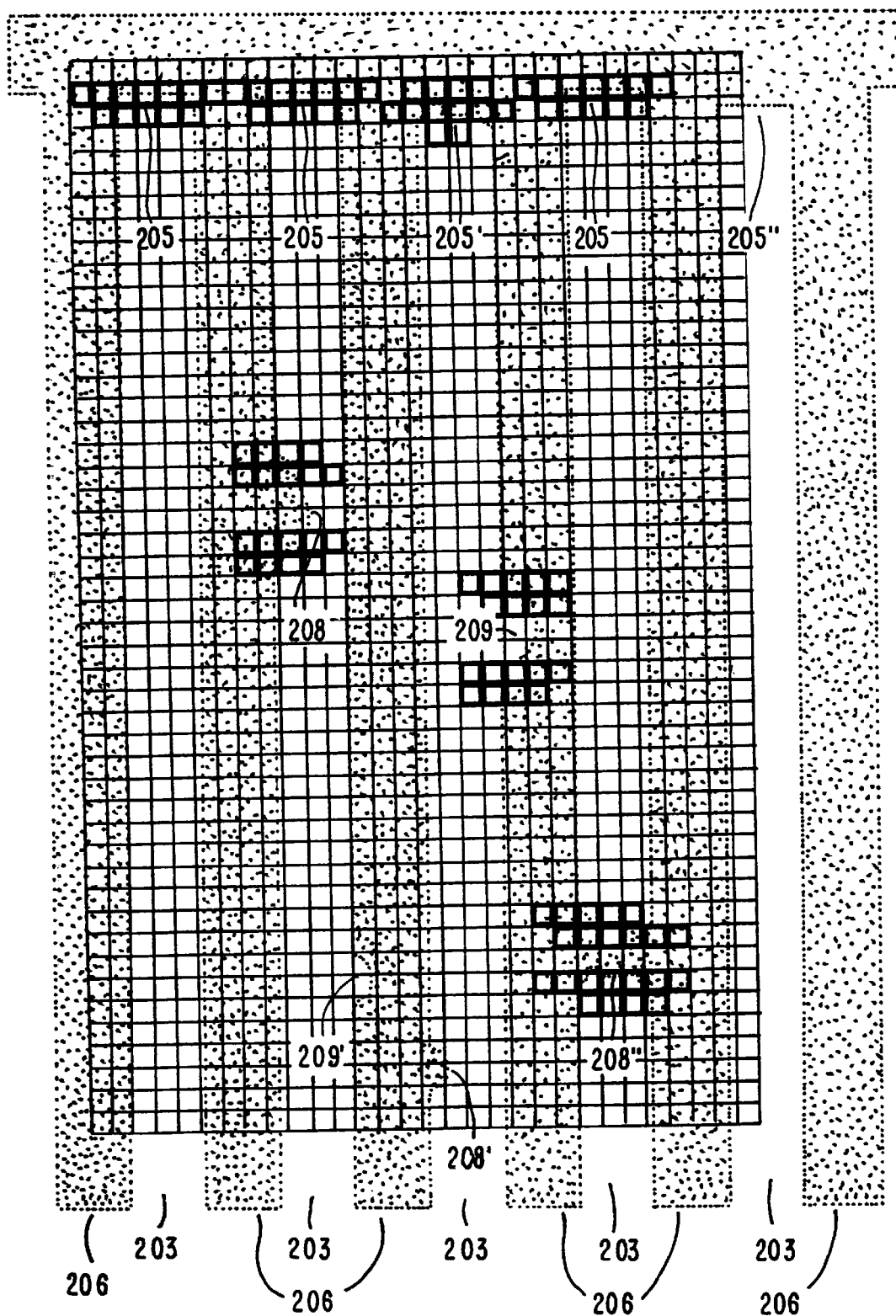
FIG. 16 is a diagram of the portion of aperture grill illustrated in FIG. 14 to which reference will be made in describing a convolution operation.

Since slit ends and defects in the ribbons of an aperture grill can create horizontal light intensity transitions, the pixels roughly corresponding to one such transition can be considered to roughly identify the location of a slit end or a potential etch defect. Applying the convolution process to the entire region imaged in FIG. 14 and highlighting the sensor imaging areas of the pixels corresponding to relatively extreme convolution results produces the diagram of FIG. 16. As illustrated in FIG. 16, pixels corresponding to each of slit ends 205 and 205' and each of defects 208, 209, and 208" have been identified by the convolution process. Note that relatively smaller etch defects 209 and 208' have not been detected.

The foregoing simplified example of an operation of the present invention has been included to facilitate explanation of the invention and is not to be considered a limitation thereon. As will be apparent to one of ordinary skill in the art, the size of the sensor imaging area and the size or nature of the kernel can be adjusted to allow detection and rough location of defects of any size. Moreover, changing these parameters or adjusting the filtering step of the convolution process can be used to increase the accuracy with which the location of a defect is determined.

In step S3, the light intensity value data corresponding to the pixels accentuated by the convolution operation are supplied to memory array 162 for storage. Preferably, the addresses of the pixels corresponding to the potential etch defects and slit edges are stored. Optionally, light intensity value data of pixels adjacent the accentuated pixels are also stored in memory array 162.

In step S4, processor 164 reads the light intensity value data from memory array 162 and filters the data to remove those light intensity values corresponding to slit edges. A preferred manner of such filtering exploits the general observation that pixels accentuated by the convolution process and attributable to slit edges tend to be arranged linearly with respect to one another. This observation is corroborated by the illustration of FIG. 16. There, those pixels attributable to the slit edges are located in a horizontal band of pixels three pixels wide. Clearly, the width of this band will depend upon the particular nature of the etching process.

Preferably, processor 164 scans the address data stored in memory 162 to identify the highest concentration of pixel addresses that are linearly adjacent. All pixels disposed along this linear arrangement or disposed within a certain distance measured perpendicular from the linear arrangement can be considered attributable to the slit edges. All such pixels are then deleted from memory 162. In this manner, the stored pixels corresponding to slit edges are removed from the memory.

The concentration of pixel addresses that are linearly adjacent also can be determined by counting the number of pixels sharing the same horizontal or vertical address component. The address component shared by the largest number of pixels can be considered the position along which slit edges are linearly disposed. Alternatively, processor 164 can compare each count of pixels sharing the same address component to a predetermined threshold value. If a count of pixels exceeds the threshold value, then that address component can be considered the position along which slit edges are linearly disposed. In some applications, adjacent pixels attributable to a slit edge will display a "crescent"-type shape, e.g. ")".

In step S5, the pixel data remaining in memory 162 are sorted and grouped into clusters or "blobs" of pixels which can be attributed to a generally contiguous light intensity transition extending horizontally. A blob will generally be a contiguous set of pixels that together satisfy specific criteria. Numerous techniques exist for identifying and classifying pixels as blobs and/or types of blobs by applying various criteria. In the present invention, two methods of blob classification are especially advantageous.

In both methods, a particular pixel is considered to be part of a blob only if it is spatially adjacent another pixel in the blob. In the first method, only spatially adjacent pixels incorporating a "solid n×n square" of pixels, "n" representing the number of pixels on each side of the square, are considered to be blobs. According to the second method, spatially adjacent pixels sharing at least one edge with one another are considered a blob if at least m pixels are so "joined." Sets of pixels satisfying either definition are grouped together to form a blob.

As an example, applying the above methods to the pixels represented in FIG. 16, each of the contiguous groups of adjacent pixels near etch defects 208, 209, and 208' may be considered a separate blob. As shown, detected etch defects tend to be bordered on two sides by two separate blobs. Pixels not fitting either definition of a blob (not shown in FIG. 16) can be considered noise values or acceptably small defects and accordingly removed from memory.

In step S6, processor 164 analyzes the blobs to determine if any blob or set of blobs indicates an etch defect. Preferably, each blob or set of blobs is evaluated according to one or more predetermined conditions to determine the existence of an etch defect. A great number of conditions for discerning etch defects are possible and it will be understood by one of ordinary skill in the art that the particular condition implemented depends heavily upon the particular application.

The following will provide a sampling of the different techniques advantageously utilized to identify etch defects by analyzing blob data. As mentioned previously, it has been found that in aperture grill inspections etch defects are usually detected as a pair of blobs located on two sides of the defect. Consequently, pairing blobs, e.g. classifying two particular blobs as a "pair," is the primary method for identifying etch defects.

As a starting point, it should be noted that each of the standards used to classify sets of pixels as blobs can be expanded upon and used on sets of blobs to match two blobs in a pair. For example, blobs can be compared on the basis of size. To determine the size of a blob, the number of pixels in the blob are counted by the processor to produce a blob size value represented by a size signal. The size signal is stored in memory 162 with the blob data or may be temporarily stored within processor 164. Processor 164 then compares the blob size values of the blobs to a minimum blob size value. If a particular blob's size is smaller than the minimum blob size, it is not considered part of a defect of problematic size. Blobs exceeding the minimum blob size value are considered as candidates for pairing.

For certain etch defects, often symmetric or otherwise regular-shaped defects, the blobs produced from such a defect are approximately equal in size. Accordingly, a useful technique for pairing blobs is using processor 164 to calculate and compare the blob sizes of the blobs in memory 162 to determine pairs of blobs having approximately equal sizes. Such pairs are then considered as representative of an etch defect.

A common characteristic of typical etch defects is the limited size of the defect. A limit on the expected size of the defect corresponds to a limitation on the possible distance between two blobs attributable to the same etch defect. Accordingly, processor 164 can be operable to calculate or otherwise estimate the distance between pairs of blobs. Those pairs of blobs separated by a distance characteristic of the typical etch defects can thus be identified. Such a characteristic distance can be expressed as a range of distances or the like.

Following the same principle, the size of the sensor imaging area represented by a pair of blobs can be estimated by processor 164 to provide an indication of the size of a potential defect imaged thereby. Preferably, this indication takes the form of an area signal which represents the estimated size. The area signal may then undergo further processing to develop a more accurate estimate of the size of an actual defect.

According to one method for estimating the size of a potential defect represented by a pair of blobs, processor 164 measures the height and determines the center of each of the blobs. The heights are averaged together to produce an average height value and the distance between the two centers is calculated to produce a width value. Multiplying the average height value by the width value yields a reasonable estimate of the size of the potential defect.

According to another method for estimating the size of a potential defect represented by a pair of blobs, processor 164 measures the height of each blob and locates corresponding corner locations on each. The heights are averaged together to produce an average height value while the distance between two corresponding corner locations is calculated to produce a width value. Multiplying the average height value by the width value again yields a reasonable estimate of the size of the potential defect.

According to still another method, a more exact estimate of the size of a potential etch defect represented by a pair of blobs can be achieved utilizing the light intensity data of the pixels forming each blob. Specifically, the light intensity value for each pixel can be considered to be proportional to the amount of the corresponding sensor imaging area that images a portion of the aperture grill. The area of ribbon imaged by a pixel equals the pixel's light intensity value divided by the saturated intensity value. The area of slit imaged by a pixel equals the pixel's light intensity value divided by the saturated intensity value and subtracted from one. For example, a light intensity value of 63, on a 0–255 scale, corresponds to approximately one-quarter (63/255) of a sensor imaging area being attributable to a slit and approximately three-quarters ([255–63]/255) of a sensor imaging area being attributable to a ribbon.

If the size of a potential over-etch defect is to be calculated, the amount of sensor imaging area for each pixel of each blob attributable to "open" areas or slits is summed to produce an estimate of the size of the defect imaged thereby. Similarly, if the size of a potential under-etch defect is to be calculated, the amount of sensor imaging area for each pixel of each blob attributable to "closed" areas or ribbons is summed to produce an estimate of the size of the defect imaged thereby.

Determination of whether a particular potential defect is of the over-etch or under-etch type can be achieved by simple arithmetic manipulation of the light intensity values attributable to the defect and the surrounding grill area. For example, by subtracting each light intensity value in the relevant area from the light intensity value of its immediate neighbor, a characteristic negative-to-positive or positive-to-negative transition is revealed indicating the particular type of defect.

Once the size of the potential defect represented by a pair of blobs is estimated, it may be compared to a predetermined size to determine whether it represents a defect of problematic size. Potential defects greater than the predetermined size may be considered actual defects or subjected to further investigation, while smaller potential defects can be ignored or otherwise processed.

Thus, by implementing one or more of the above-described criteria, blobs likely caused by the same etch defect can be paired. Upon pairing, or after further testing, the two blobs can be classified as indicating a defect of problematic size. It should be noted that the present invention is not limited merely to defects indicated by pairs of blobs. Defects which are detected as only one blob or more than two blobs can be evaluated with a straightforward extrapolation of the techniques described hereinabove.

In step S7, the size of each defect indicated by a pair of blobs is estimated by processor 164 using one or more of the techniques for estimating defect size described above. Of course, the estimation need not be repeated if similar results from step S6 were obtained and retained.

In step S8, processor 164 outputs one or more signals representing the location and estimated size of each defect detected. The location of the defect will correspond to the pixel coordinates of the blobs representing the defect while the defect's size can be calculated from the blobs as explained above.

Figure 17:
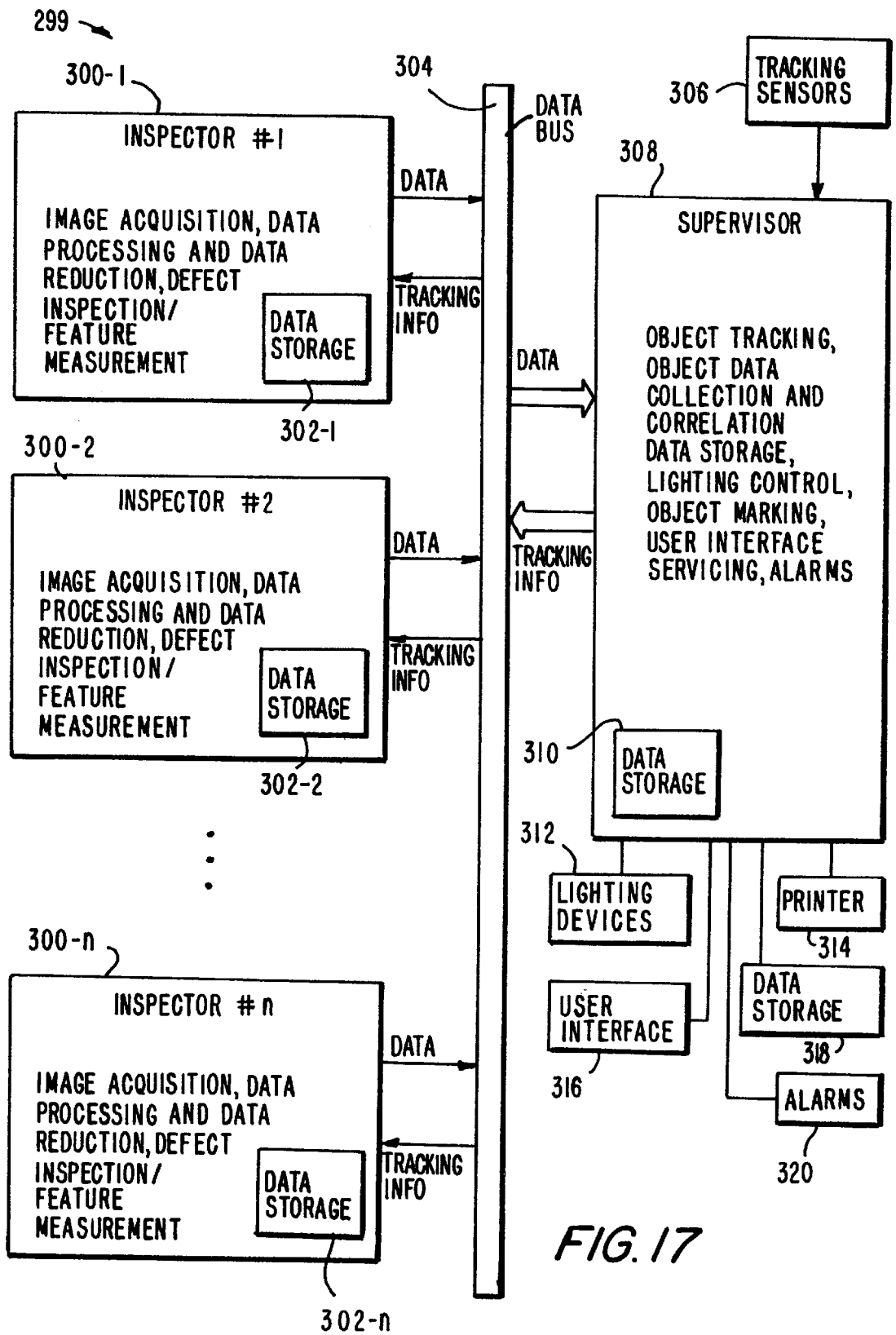
FIG. 17 is diagram of the organizational structure of an integrated automatic visual inspection apparatus according to an embodiment of the present invention.

The edge detection, pitch defect detection, width defect detection and etch defect detection apparatuses described hereinabove are advantageously organized into an automated inspection apparatus 299 as illustrated in FIG. 17. The automated inspection apparatus 299 is comprised of a number n of inspectors 300-1, 300-2, . . . , 300-n; a data bus 304; tracking sensors 306; a supervisor 308; lighting devices 312; printer 314; user interface 316; data storage 318; and alarms 320. Each inspector may include a separate data storage medium 302-x (x=1, 2, . . . , n). Similarly, supervisor 308 may include a data storage medium 310. As illustrated, the apparatus can be flexibly expanded to accomodate various configurations of potentially different types of inspection apparatuses.

Each of inspectors 300-1, 300-2, . . . , 300-n, can be one of the edge detection, pitch defect detection, width defect detection and etch defect detection apparatuses described herein. The inspectors are preferably comprised of two microprocessor systems, an MV200 (a Datacube image processor) for image processing and an MVME167 (a Motorola 68040-based processor) for image post-processing and communications.

Each inspector acquires an image of the object to be inspected and converts the image into image data. The image data is processed by the inspector to isolate the relevant feature(s) of the object and to reduce the amount of data needed to convey information regarding the relevant feature (s). Such relevant feature(s) may include the size, shape, or location of a defect, or of a characteristic feature of the object, or the like. Data regarding the relevant feature is stored temporarily in the particular inspector in a local data storage medium 302-x. Following local processing, the inspector supplies the processed data regarding the inspected object to supervisor 308 via data bus 304. Data bus 304 is a conventional device such as an Ethernet communication system.

Synchronization with the object(s) to be inspected is maintained by means of tracking signals supplied by supervisor 308 through data bus 304. The tracking signals provide tracking information regarding the movement or location of the object(s) to be inspected. Optionally, an inspector may receive tracking signals directly from one of tracking sensors 306. Tracking sensors 306 are devices for monitoring the movement of objects past the inspectors and may include mask sensors, cycle detectors, and an encoder. The tracking sensors output tracking signals representing the positions of the objects to be inspected.

Supervisor 308 is preferably a microprocessor-based system such as the MVME167 programmed for image data collection, image data correlation, image data processing, communications, sensor data collection, lighting device control, printer control, user interface servicing, servicing external data storage, and activating alarms. Supervisor 308 tracks the objects to be inspected as a function of tracking signals received from tracking sensors 306 and supplies tracking signals representing tracking information to the inspectors. Based upon the tracking signals, supervisor 308 issues control signals to lighting devices 312, which illuminate objects for inspection, to influence such illumination.

Upon inspection of one or more objects and processing of the image data by the inspectors, supervisor 308 polls each inspector and receives processed image data regarding specific features of the inspected objects. The supervisor organizes the processed image data from the inspectors according to inspected object, utilizing data storage 310 as needed. Preferably, the image data corresponding to a particular object is analyzed to determine the most important features of the object so that data corresponding to these important features can be retained while redundant or less important data is discarded. Such an operation can result in a significant data reduction. For example, if an inspected object has been determined to exhibit several defects of varying sizes, the information regarding the largest defects can be retained as a characterization of the object while the remaining defect information can be discarded. Such important data may be stored in external data storage 318 or supplied to a user through user interface 316.

As a function of the important data filtered from the processed data supplied by the inspectors, supervisor 308 classifies each inspected device as a member of a particular class and controls printer 314 to mark the object accordingly. Alternatively, when an object having certain characteristics is detected, the supervisor may cause one of alarms 320 to sound and/or supply a message to a user through user interface 316. The user may request certain information from the supervisor or otherwise control the supervisor's operation through interface 316. Of course, printer 314, interface 316, and alarms 320 may be replaced by similar devices for distinguishing inspected objects or notifying a user of certain inspection conditions.

As will be appreciated by one of ordinary skill in the art, the present invention is operable to inspect any type of perforated object both in whole and in part. Light passing through or reflecting off of the object to be inspected results in an image that is detected by the imaging device. In accordance with the techniques described herein or obvious modifications thereof or with known techniques, the detected image is processed to detect and classify defects in the object. Adaptation of the described embodiments to accommodate specific object configurations, specific processing criteria, or specific defect criteria clearly fall within the scope of the appended claims as such adaptation is obvious, in view of the present disclosure, to one of ordinary skill. Thus, it must be understood that the configuration of the object to be inspected by the apparatus of the present invention is not limited to the illustrative examples described herein.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. Automated visual multiple-inspection system for inspecting one or more objects for identifying one or more features not conforming to a predetermined standard for determining one or more defects, comprising:

a plurality of inspection devices each for identifying one or more features not conforming to a predetermined standard for determining one or more defects, each of said plurality of inspection devices comprising:
means for acquiring an image of an object;
means for converting said image into an image data signal;
means for processing said image data signal to identify one or more features of said object not conforming to a predetermined standard for determining one or more defects;
means for storing an information signal corresponding to said determined one or more defects of said object; and
means for transmitting said information signal;
a supervisor comprised of:
means for receiving a plurality of said information signals;
means for sorting said plurality of information signals according to a particular object represented thereby; and
means for determining a most important information signal from among information signals representing one particular object; and
data bus means, coupled to said plurality of inspection devices and to said supervisor, for carrying information signals.

2. System according to claim 1, wherein an inspection device is an edge detection apparatus.

3. System according to claim 1, wherein an inspection device is a pitch defect detection apparatus.

4. System according to claim 1, wherein an inspection device is a width defect detection apparatus.

5. System according to claim 1, wherein an inspection device is an edge defect detection apparatus.

6. System according to claim 1, further comprising tracking sensor means for tracking said one or more objects and for generating a plurality of tracking signals; and wherein said supervisor includes means for generating tracking information signals as a function of said plurality of tracking signals.

7. System according to claim 1, wherein said supervisor further comprises means for classifying each said particular object in a class as a function of said most important information signal.

8. System according to claim 7, further comprising marking means for marking each said particular object and wherein said supervisor controls said marking means as a function of said class.

* * * * *